(12) United States Patent
Eyer

(10) Patent No.: US 10,313,764 B2
(45) Date of Patent: Jun. 4, 2019

(54) PROCESSING AND PROVIDING AN IMAGE IN WHICH A PLURALITY OF SYMBOLS ARE ENCODED

(71) Applicant: Sony Corporation, Tokyo (JP)

(72) Inventor: Mark Eyer, Woodinville, WA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/653,288

(22) Filed: Jul. 18, 2017

(65) Prior Publication Data

US 2017/0318358 A1    Nov. 2, 2017

Related U.S. Application Data

(63) Continuation of application No. 14/680,752, filed on Apr. 7, 2015, now Pat. No. 9,756,401.

(51) Int. Cl.
*H04N 7/08*      (2006.01)
*H04N 21/8358*   (2011.01)
(Continued)

(52) U.S. Cl.
CPC ....... *H04N 21/8358* (2013.01); *G06T 1/0028* (2013.01); *H04N 7/025* (2013.01);
(Continued)

(58) Field of Classification Search
CPC .......... H04N 21/8358; H04N 21/4622; H04N 21/8586; H04N 21/44008; H04N 7/025;
(Continued)

(56) References Cited

U.S. PATENT DOCUMENTS

| | | | | |
|---|---|---|---|---|
| 6,661,905 B1* | 12/2003 | Chupp | .................. | H04N 7/025 |
| | | | | 348/E7.017 |
| 7,760,936 B1* | 7/2010 | King | .................... | H04N 19/176 |
| | | | | 382/166 |
| 2004/0148503 A1* | 7/2004 | Sidman | ............... | H04L 63/0428 |
| | | | | 713/167 |
| 2006/0269096 A1* | 11/2006 | Kumar | .................. | G06T 1/0057 |
| | | | | 382/100 |

(Continued)

FOREIGN PATENT DOCUMENTS

WO    2011/050978    5/2011

OTHER PUBLICATIONS

International Search Report and Written Opinion dated Aug. 25, 2016 in PCT/US16/26173 filed Apr. 6, 2016.

*Primary Examiner* — Howard D Brown, Jr.
(74) *Attorney, Agent, or Firm* — Oblon, McClelland, Maier & Neustadt, L.L.P.

(57) ABSTRACT

A reception apparatus, method, and non-transitory computer-readable storage medium for processing an image in which a plurality of symbols is encoded. The reception apparatus includes circuitry configured to receive or retrieve an image in which one of a plurality of predetermined run-in patterns and a plurality of symbols is encoded using a set of luminance values, and determine which of the plurality of run-in patterns is encoded in the image. The circuitry is configured to determine a slice point used to determine data values of the plurality of symbols encoded in the image based on which of the plurality of predetermined run-in patterns is determined to be encoded in the image. Further, the circuitry is configured to determine the data values of the plurality of symbols encoded in the image based on the determined slice point.

18 Claims, 21 Drawing Sheets

(51) Int. Cl.
*G06T 1/00* (2006.01)
*H04N 21/84* (2011.01)
*H04N 21/235* (2011.01)
*H04N 7/025* (2006.01)
*H04N 21/44* (2011.01)
*H04N 21/462* (2011.01)
*H04N 21/858* (2011.01)
*G06K 9/00* (2006.01)

(52) U.S. Cl.
CPC .............. *H04N 7/08* (2013.01); *H04N 21/235* (2013.01); *H04N 21/44008* (2013.01); *H04N 21/4622* (2013.01); *H04N 21/84* (2013.01); *H04N 21/8586* (2013.01); *G06T 2200/28* (2013.01); *G06T 2201/0051* (2013.01); *G06T 2201/0065* (2013.01); *G06T 2201/0202* (2013.01)

(58) Field of Classification Search
CPC ........ H04N 21/84; H04N 21/235; H04N 7/08; G06T 1/0028; G06T 2201/0202; G06T 2201/0065; G06T 2201/0051; G06T 2200/28
See application file for complete search history.

(56) References Cited

U.S. PATENT DOCUMENTS

| | | | |
|---|---|---|---|
| 2008/0233420 A1* | 9/2008 | McCracken | B22F 1/0055 428/546 |
| 2010/0014122 A1* | 1/2010 | Massicot | H04N 1/32154 358/3.28 |
| 2010/0121907 A1* | 5/2010 | McKnight | G06Q 30/02 709/202 |
| 2010/0135384 A1* | 6/2010 | Berkvens | G06T 1/0021 375/240.2 |
| 2010/0150394 A1* | 6/2010 | Bloom | G06T 1/0035 382/100 |
| 2011/0142294 A1* | 6/2011 | Sagan | G07D 7/2033 382/112 |
| 2011/0280436 A1* | 11/2011 | Kalker | G06T 1/0064 382/100 |
| 2012/0314766 A1* | 12/2012 | Chien | H04N 19/176 375/240.12 |
| 2012/0315011 A1* | 12/2012 | Messmer | H04N 21/8358 386/230 |
| 2013/0336522 A1* | 12/2013 | Reed | G06T 1/005 382/100 |
| 2017/0193628 A1* | 7/2017 | Sharma | G06T 1/0064 |
| 2018/0167630 A1* | 6/2018 | Zhao | H04N 21/8358 |

* cited by examiner

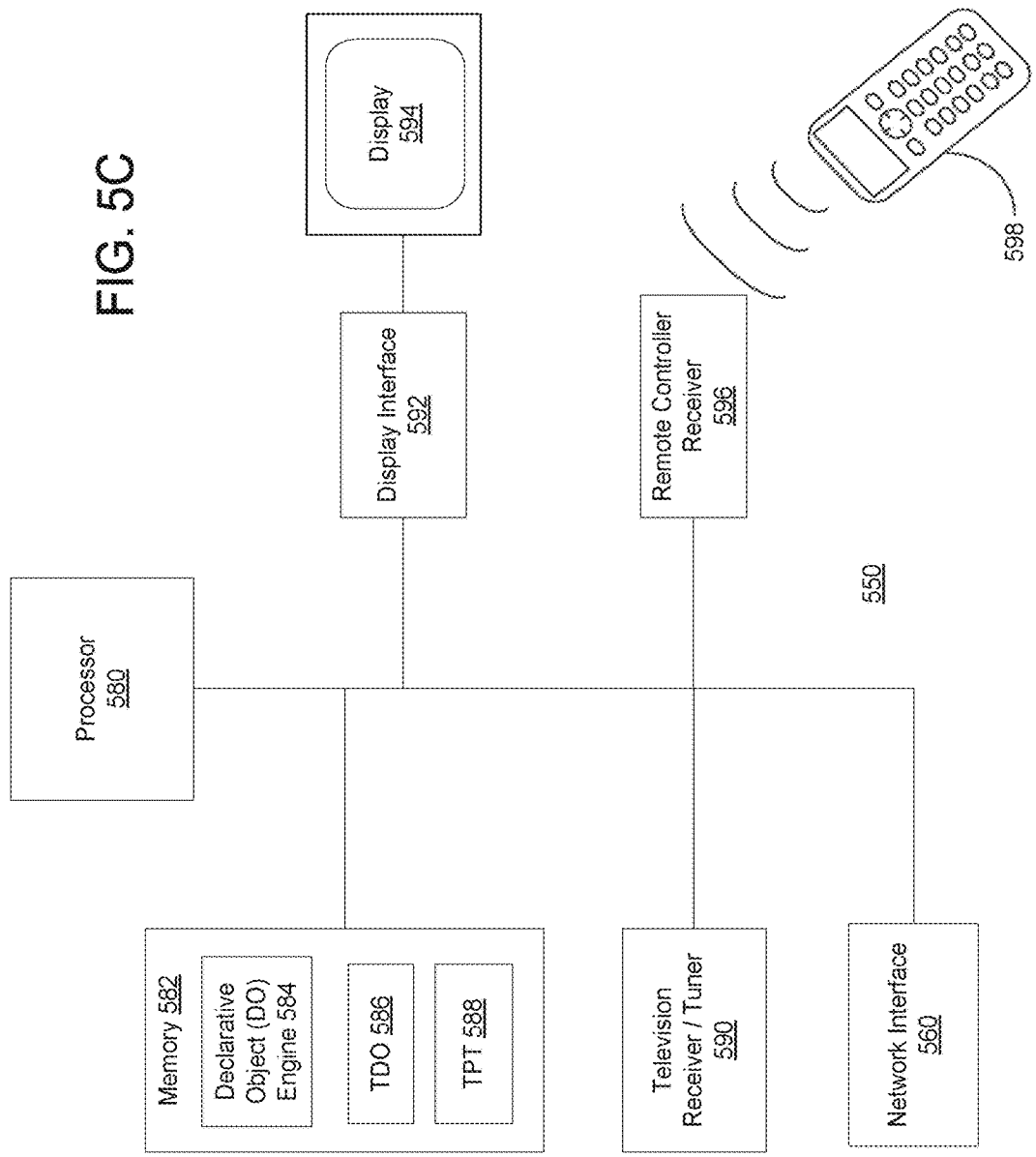

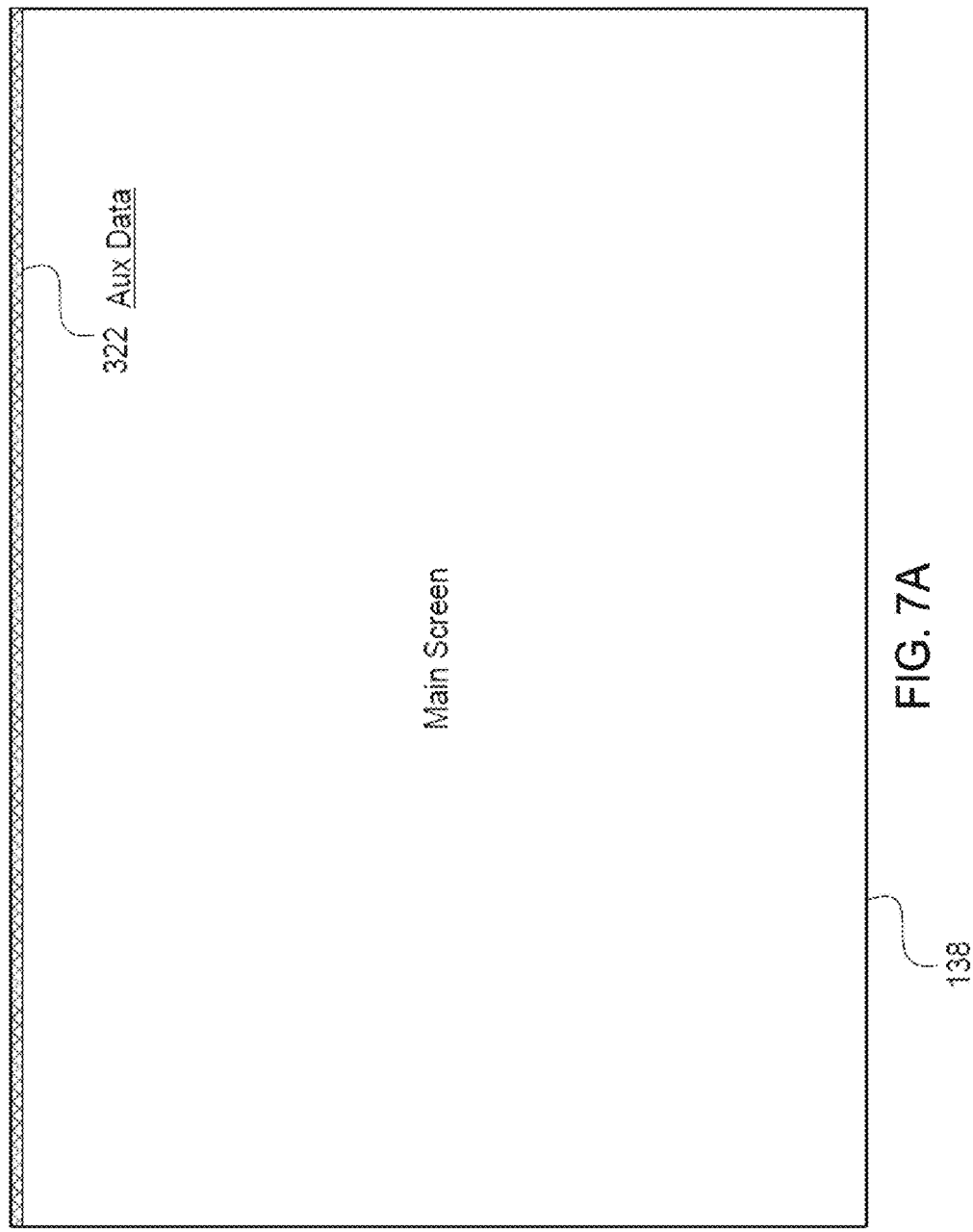

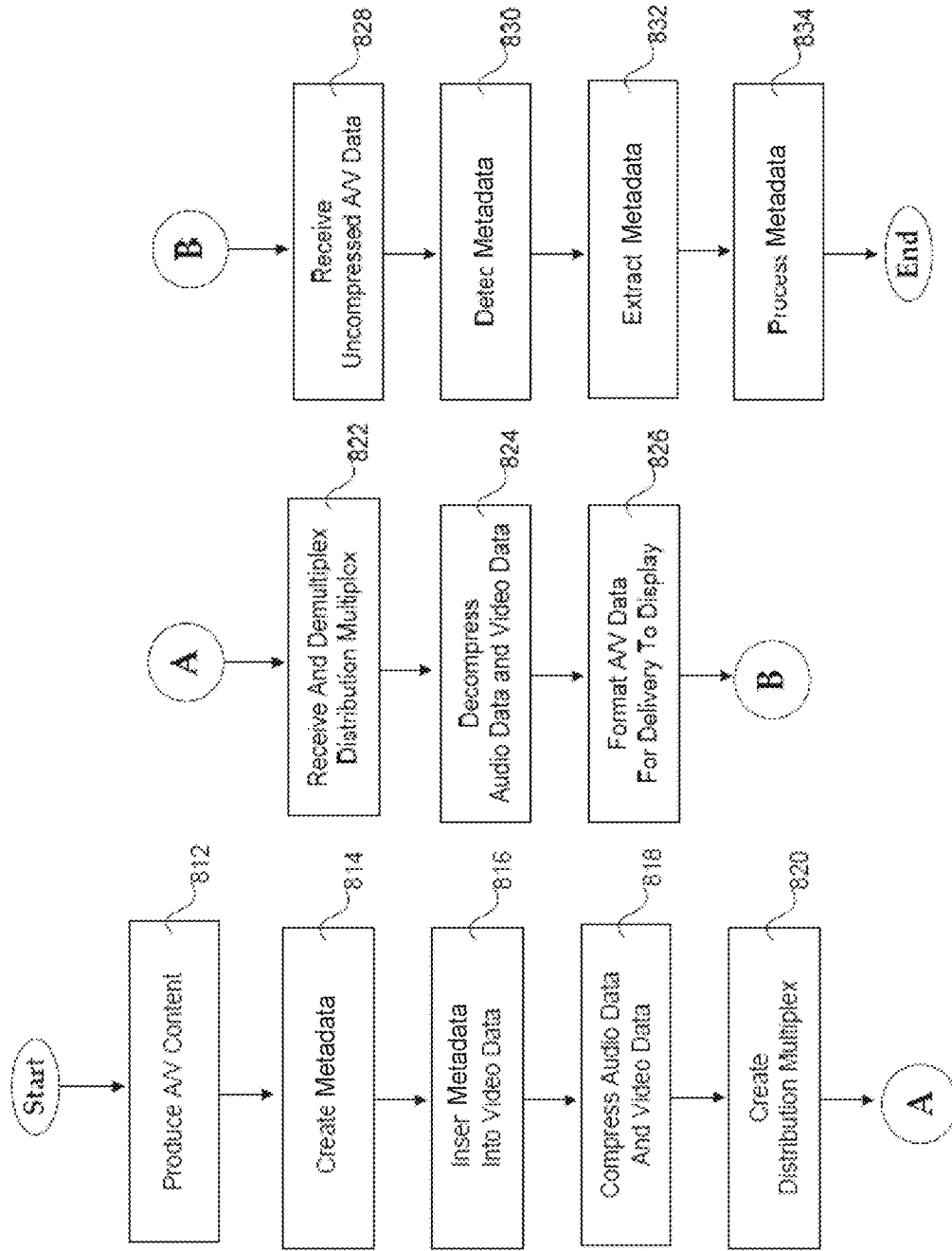

```
function deriveSymbols() {  // derive symbol values by
averaging luminance over 8 pixels
        var i, j, a;
        for (i=0; i<240; i++) {  // save average luma per
symbol
            a = 0;
            for (j=0; j<8; j++) {
                a += rawLuma[(i*8)+j];
            }
            mySymbols[i] = a/8;  // average luma of 8 sample
        }
    }
```

FIG. 14A

```
    for (j=0; j<240; j++) {  // for
each symbol
            n =
Math.round(mySymbols[j]);
            bins[n]++;
        }
```

FIG. 14B

```
    // find max value in
range 21 to 100
        m = 0;
        peak = 0;
        for (j=20; j<100;
j++) {
            if (bins[j] > m) {
                m = bins[j];
                peak = j;
            }
        }
```

FIG. 14C

PROCESSING AND PROVIDING AN IMAGE IN WHICH A PLURALITY OF SYMBOLS ARE ENCODED

CROSS-REFERENCE TO RELATED APPLICATIONS

This application is a continuation of U.S. application Ser. No. 14/680,752 filed Apr. 7, 2015, the entire contents of both of which are incorporated herein by reference.

BACKGROUND OF THE INVENTION

Field of the Invention

Embodiments described herein relate generally to a method, non-transitory computer-readable storage medium, and reception apparatus for processing an image in which a plurality of symbols is encoded; and a method, non-transitory computer-readable storage medium, and an information providing apparatus for providing the image.

Background

Implementing effective methods for distribution of digital data within digital television systems is a significant consideration for designers and manufacturers of contemporary electronic entertainment systems. However, effectively implementing such systems may create substantial challenges for system designers. For example, enhanced demands for increased system functionality and performance may require more capabilities and require additional hardware and software resources. Impediments to the effective delivery of digital data in advanced systems may result in a corresponding detrimental economic impact due to operational inefficiencies, lost revenue opportunities, and reduced functionality.

Furthermore, enhanced system capability to perform various advanced operations can offer additional benefits to the end user, but may also place increased demands on the control and management of various system components. For example, an enhanced electronic system that effectively supports synchronized television widget functionality may benefit from methods providing flexible carriage of the data stream supporting this functionality.

Due to growing demands on system resources and substantially increasing data magnitudes, it is apparent that developing new techniques for implementing and utilizing data distribution through digital television systems, and other video distribution systems, is a matter of concern for related electronic technologies. Therefore, for all the foregoing reasons, developing effective systems for implementing and utilizing data distribution through digital television systems, and the other video distribution systems, remains a significant consideration for designers, manufacturers, and users of contemporary electronic entertainment systems.

SUMMARY OF THE INVENTION

According to an embodiment of the present disclosure, there is provided a reception apparatus, including circuitry that is configured to receive or retrieve an image in which a plurality of symbols is encoded. The circuitry determines a set of luminance values used to encode the symbols based on luminance values of a plurality of pixels included in the image. The circuitry determines a highest luminance value used to encode the symbols in the image based on the determined set of luminance values. Further, the circuitry derives data values of the symbols encoded in the image based on the set of luminance values and using the determined highest luminance value.

Further, according to an embodiment of the present disclosure, there is provided a method for processing an image in which a plurality of symbols is encoded. The method includes receiving or retrieving, by circuitry of a reception apparatus, the image in which the plurality of symbols is encoded. A set of luminance values used to encode the symbols is determined based on luminance values of a plurality of pixels included in the image. A highest luminance value used to encode the symbols in the image is determined, by the circuitry, based on the determined set of luminance values. Further, data values of the symbols encoded in the image are derived, by the circuitry, based on the set of luminance values and using the determined highest luminance value.

Further, according to an embodiment of the present disclosure, there is provided a non-transitory computer-readable medium storing instructions which when executed by a computer causes the computer to perform a method for processing an image in which a plurality of symbols is encoded. The method includes receiving or retrieving the image in which the plurality of symbols are encoded. A set of luminance values used to encode the symbols is determined based on luminance values of a plurality of pixels included in the image. A highest luminance value used to encode the symbols in the image is determined based on the determined set of luminance values. Further, data values of the symbols encoded in the image are derived based on the set of luminance values and using the determined highest luminance value.

Further, according to an embodiment of the present disclosure, there is provided a reception apparatus including circuitry configured to receive or retrieve an image in which a plurality of symbols is encoded. The circuitry determines a first set of luminance values used to encode a first subset of the symbols based on luminance values of a first plurality of pixels included in the image. The circuitry derives data values of the first subset of the symbols encoded in the image based on a first predetermined slice point. The circuitry determines a luminance value used to encode a second subset of the symbols in the image based on the derived data values of the first subset of the symbols. The circuitry determines a second set of luminance values used to encode the second subset of the symbols based on luminance values of a second plurality of pixels included in the image. Further, the circuitry derives data values of the second subset of the symbols encoded in the image based on the second set of luminance values and using the determined luminance value.

Further, according to an embodiment of the present disclosure, there is provided a method for processing an image in which a plurality of symbols is encoded. The method includes receiving or retrieving, by circuitry of a reception apparatus, an image in which a plurality of symbols is encoded. A first set of luminance values used to encode a first subset of the symbols is determined based on luminance values of a first plurality of pixels included in the image. Data values of the first subset of the symbols encoded in the image are derived based on a first predetermined slice point. A luminance value used to encode a second subset of the symbols in the image is determined, by the circuitry, based on the derived data values of the first subset of the symbols. A second set of luminance values used to encode the second subset of the symbols is determined based on luminance values of a second plurality of pixels included in the image. Data values of the second subset of the symbols encoded in the image are determined, by the circuitry, based on the second set of luminance values and using the determined luminance value.

Further, according to an embodiment of the present disclosure, there is provided a non-transitory computer-readable medium storing instructions which when executed by a computer causes the computer to perform a method for processing an image in which a plurality of symbols is encoded. The method includes receiving or retrieving an image in which a plurality of symbols is encoded. A first set of luminance values used to encode a first subset of the symbols is determined based on luminance values of a first plurality of pixels included in the image. Data values of the first subset of the symbols encoded in the image are derived based on a first predetermined slice point. A luminance value used to encode a second subset of the symbols in the image is determined based on the derived data values of the first subset of the symbols. A second set of luminance values used to encode the second subset of the symbols is determined based on luminance values of a second plurality of pixels included in the image. Data values of the second subset of the symbols encoded in the image are determined based on the second set of luminance values and using the determined luminance value.

Further, according to an embodiment of the present disclosure, there is provided an information providing apparatus, including circuitry configured to receive or retrieve an image in which a plurality of symbols is to be encoded. The circuitry encodes the plurality of symbols in the image. The plurality of symbols is encoded in the image using luminance values of a plurality of pixels included in the image. The circuitry further provides the image in which the plurality of symbols is encoded to a reception apparatus. A luminance value used to encode at least one of the plurality of symbols is set by an operator.

Further, according to an embodiment of the present disclosure, there is provided a method for providing an image in which a plurality of symbols is encoded. The method includes receiving or retrieving an image in which the plurality of symbols is to be encoded. The plurality of symbols is encoded, by circuitry of an information providing apparatus, in the image. The plurality of symbols is encoded in the image using luminance values of a plurality of pixels included in the image. Further, the image in which the plurality of symbols is encoded is provided, by the circuitry, to a reception apparatus. A luminance value used to encode at least one of the plurality of symbols is set by an operator.

Further, according to an embodiment of the present disclosure, there is provided a non-transitory computer-readable medium storing instructions which, when executed by a computer, causes the computer to perform a method for providing an image in which a plurality of symbols is encoded. The method includes receiving or retrieving an image in which the plurality of symbols is to be encoded. The plurality of symbols is encoded in the image. The plurality of symbols is encoded in the image using luminance values of a plurality of pixels included in the image. Further, the image in which the plurality of symbols is encoded is provided to a reception apparatus. A luminance value used to encode at least one of the plurality of symbols is set by an operator.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 5A-5C are exemplary block diagrams of the reception apparatus, in accordance with certain embodiments of the present disclosure;

FIGS. 7A and 7B are diagrams of digital data embedded in video data, in accordance with two different embodiments of the present disclosure; and FIGS. 8A-8C are a flowchart of method steps for distributing digital data, in accordance with one embodiment of the present disclosure.

FIGS. 14A-14C illustrate exemplary JavaScript code for implementing a watermark recovery algorithm, in accordance with one embodiment of the present disclosure.

DETAILED DESCRIPTION

Figure 1A:
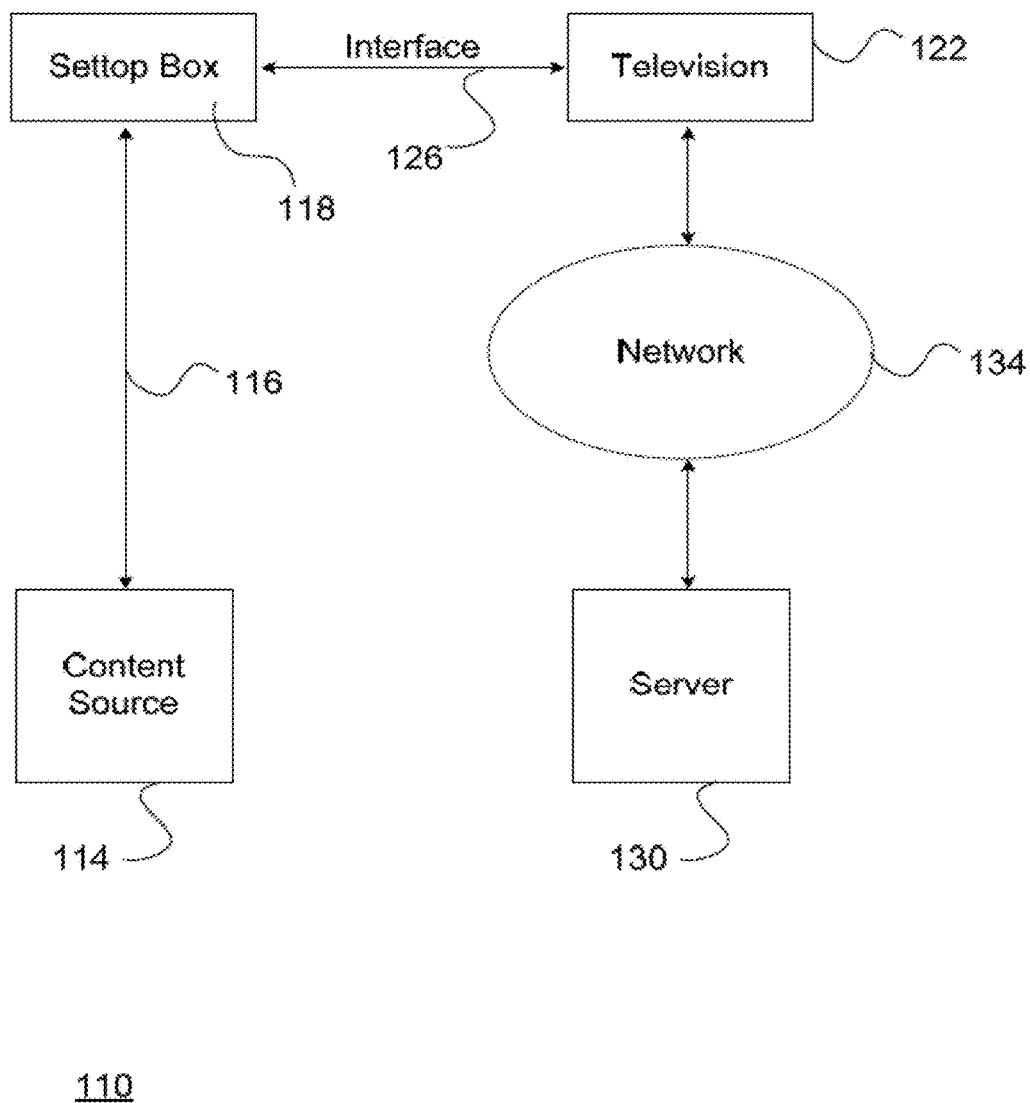
FIG. 1A is a block diagram of an electronic system, in accordance with one embodiment of the present disclosure.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings. The specification includes the following description and attached appendices.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the present disclosure relate to the delivery of digital data (e.g., metadata, application data, program guide data, closed caption data, etc.) in video data. The digital data is embedded as a watermark in the video data. The use of the first one or two lines of a video to deliver digital data works well for cases where display devices operate in an over scan mode (e.g., they only display the middle ~95% of active video lines). If the display is set to a "full pixel" display mode, any watermark on the first two lines would be visible. Therefore, the use of a lower visibility watermark can be advantageous to avoid the possibility of the watermark becoming visible on the display.

The method of modulating luminance values relies on being able to recover the digital data in the receiver. Like any pulse amplitude modulation (PAM) system, the receiver must set a "slice point" to use to determine if a particular symbol is a one or zero (or, for a 2-bit per symbol system, value 00, 01, 10, or 11). Embodiments of the present disclosure avoid the need for a standard to specify exactly the nominal values for luminance that are used for the different symbol values. Therefore, the broadcaster is given the flexibility to adjust the values to tradeoff between watermark visibility and robustness. Higher values of luminance lead to higher visibility and higher robustness and/or bits per a symbol. Lower values lead to lower visibility at the cost of lower robustness and/or bits per a symbol.

Certain embodiments of the present disclosure involve a system whereby digital data is delivered within a video signal by modulating the luminance level in the first line or two of video. The digital data may be considered to be a video watermark. The design issue pertains to the way in which the receiver determines the best method to recover the watermark. For a fixed-defined system, the standard would specify one modulation method, and receivers would then implement a recovery algorithm matching the standard.

It would be advantageous if the broadcaster could have some flexibility in the way the luminance signal is modulated. In this case, a standard could specify that the lowest luminance value used to encode symbols will be 0 (wherein luminance value 16 is considered "black"), and the highest luminance value will be in a given range of values (for example, 30 to 235). For a 2-bit-per-symbol encoding, the middle two luminance values could be computed. If N is the highest luminance value used for encoding, the four codes in use would be 0, N/3, 2N/3, N. For 1-bit-per-symbol encoding, the values would be 0 and N. Higher bit-per-symbol encoding could be utilized in other embodiments.

For example, some broadcasters may choose to use low values (visibly darker) because they are concerned about visibility (some consumer devices, under some display settings, may make the first two lines of video visible to the user). Others may not be concerned about visibility, and may wish to optimize instead for robustness, knowing that a wider range of luminance values survive transcoding and heavy video compression better than a smaller range. A wider range of luminance values could also allow broadcasters to include more bits per a symbol.

Using certain embodiments, described herein, instead of or in addition to having a standard specify the required levels for luminance, the receiver determines the range of values in use by analysis and adjusts the watermark recovery algorithm accordingly. In other embodiments, the watermark itself or any encoded portion indicates the proper parameters to use for optimal recovery. In this case, the protocol delivers data that can be recovered and used to set the optimal recovery. Embodiments described herein allow the broadcaster to set the robustness level and/or bits per a symbol in use according to their desires, as a tradeoff between robustness and/or bits per a symbol and visibility of the watermark.

Although the present disclosure is primarily described using a watermark embedded in line 1 of a video frame, the watermark may be embedded in other lines or other predetermined portions of a video frame. Further, the watermark may be embedded in other image types in certain embodiments.

The present disclosure is described herein as a system and method for distributing digital data (e.g., represented by a plurality of symbols) embedded in video data, and includes a content source that embeds the digital data into the video data. The content source then encodes the video data together with the digital data to create a distribution multiplex including compressed video data. A decoder receives and decompresses the distribution multiplex to reproduce the video data with the digital data embedded. A television or other viewing device then detects and extracts the digital data from the video data.

The television or other device processes the digital data to receive information that, for example, allows the viewing device to identify a channel currently being watched and recognize a channel change; to identify the content being viewed, including short content such as interstitials; to discover a location for accessing additional information about the content (e.g., a URL of a remote server); to identify the temporal location within the content being rendered, ideally to a level of per sample or access unit accuracy; and/or to receive a time-sensitive event trigger in real time.

Referring now to FIG. 1A, a block diagram of an electronic system 110 is shown, in accordance with one embodiment of the present disclosure. In the FIG. 1A embodiment, the electronic system 110 may include, but is not limited to, a content source 114, a set-top box 118, an interface 126, a television 122, an optional network 134, and an optional server 130. In alternate embodiments, the electronic system 110 may be implemented using components and configurations in addition to, or instead of, certain of those components and configurations discussed in conjunction with the FIG. 1A embodiment. For example, any number of televisions 122 may be similarly deployed in the electronic system 110. In addition, the network 134 and the server 130 may not be included in all embodiments of the present disclosure.

In the FIG. 1A embodiment, the content source 114 may be implemented as one or more electronic devices or other entities that prepare and distribute content data, including video data and audio data, for reproduction by the television 122. In the FIG. 1A embodiment, the content source 114 may be implemented as any appropriate entity. For example, the content source 114 may include a television broadcasting facility, a cable television distribution facility, a satellite television distribution facility, or an Internet server entity. Additional details regarding the implementation and utilization of the content source 114 are further discussed below in conjunction with FIGS. 2-4.

In the FIG. 1A embodiment, the content source 114 creates an encoded distribution multiplex containing the content data in a compressed format, and then distributes the distribution multiplex through a distribution network via path 116 (e.g., a terrestrial television broadcast channel, cable TV network, satellite broadcast channel, etc.) to a reception apparatus for decoding. In certain embodiments, additional devices or entities may be interposed between the content source 114 and the set-top box 118. Examples of such entities may include, but are not limited to, a broadcast network affiliate and a service provider (such as a satellite or cable head-end).

In the FIG. 1A embodiment, the set-top box 118 decodes the encoded distribution multiplex to generate uncompressed A/V data (video data and audio data) that is provided to the television 122 via an appropriate interface 126. In the FIG. 1A embodiment, the interface 126 may be implemented in any effective manner. For example, the interface 126 may be implemented according to a High Definition Multimedia Interface (HDMI) standard that provides a high-speed parallel interface to deliver uncompressed video data and audio data, and/or control/timing signals to the television 122. The television 122 may then responsively receive and reproduce the video data and audio data for utilization by a system user. Additional details regarding the implementation and utilization of television 122 are further discussed below in conjunction with FIGS. 5-6.

In the FIG. 1A embodiment, the electronic system 110 supports additional services related to the main content data. The additional services include Declarative Objects (DOs), also referred to as applications, for providing the user's interactive experience. DOs and other additional services are described in ATSC Candidate Standard: Interactive Services Standard A/105:2014 (S13-2-389r7, Rev. 7-24 Apr. 2014), which is incorporated herein by reference in its entirety.

The television 122 may obtain the metadata from any appropriate source including, but not limited to, the content source 114 or the server 130. In the FIG. 1A embodiment, the television 122 may communicate with the server 130 via any effective network 134 including, but not limited to, the Internet. Additional details regarding the creation, distribution, and utilization of metadata are further discussed below.

The present disclosure generally involves embedding digital data (e.g., metadata) in a video signal so that the digital data may be quickly and easily recovered by receiving devices like the television 122. In certain embodiments, the content source 114 inserts the digital data within a distributed video signal so that the digital travels through the distribution chain, comes into a consumer's home via a compressed interface (from a cable, satellite, or IPTV service provider), is de-compressed in the set-top box 118, and then travels to the television 122 in an uncompressed format, where the television 122 retrieves and utilizes the embedded metadata to support the additional services, such as synchronized DOs. The foregoing techniques can circumvent service providers or other entities from intentionally or unintentionally blocking the consumer's access to the metadata that is required to provide enhanced functionality to television 122.

Certain cable, satellite, and IPTV entities typically provide system users with set-top boxes that are interfaced to digital televisions via HDMI uncompressed video interfaces or other appropriate means. If a content owner wishes to include metadata (such as a URL, applet, etc.) with the content data, and if that metadata travels with the content data as a separate digital stream (or as metadata within the compressed bit stream), the metadata will be blocked at the set-top box 118.

Typically, the set-top box 114 does not pass ancillary data streams in the distribution multiplex, because the set-top box decodes only audio data and video data, and then passes only the uncompressed video data and audio data across to the television. Ancillary data streams are therefore unavailable to the television. Further, if service providers (those offering the set-top boxes) perceive that providing access to any ancillary data is competitive to their business model, they may not be inclined to help the consumer electronics industry by providing such access.

By embedding digital data within the video data, the digital data survives compression/decompression and is able to arrive intact at the television 122. Further, in embodiments of the present disclosure, the digital data is embedded as a watermark in a manner that addresses its visibility. In other words, the present disclosure advantageously embeds digital data within the video signal (encoded within the video image, not as a separate ancillary data stream) in a manner that decreases visibility to a viewer. The present disclosure therefore not only successfully overcomes the architectural roadblock discussed above, but also limits visibility of the embedded watermark to avoid possible distraction to the viewer. The implementation and utilization of the electronic system 110 illustrated in FIG. 1A is further discussed below.

Figure 1B:
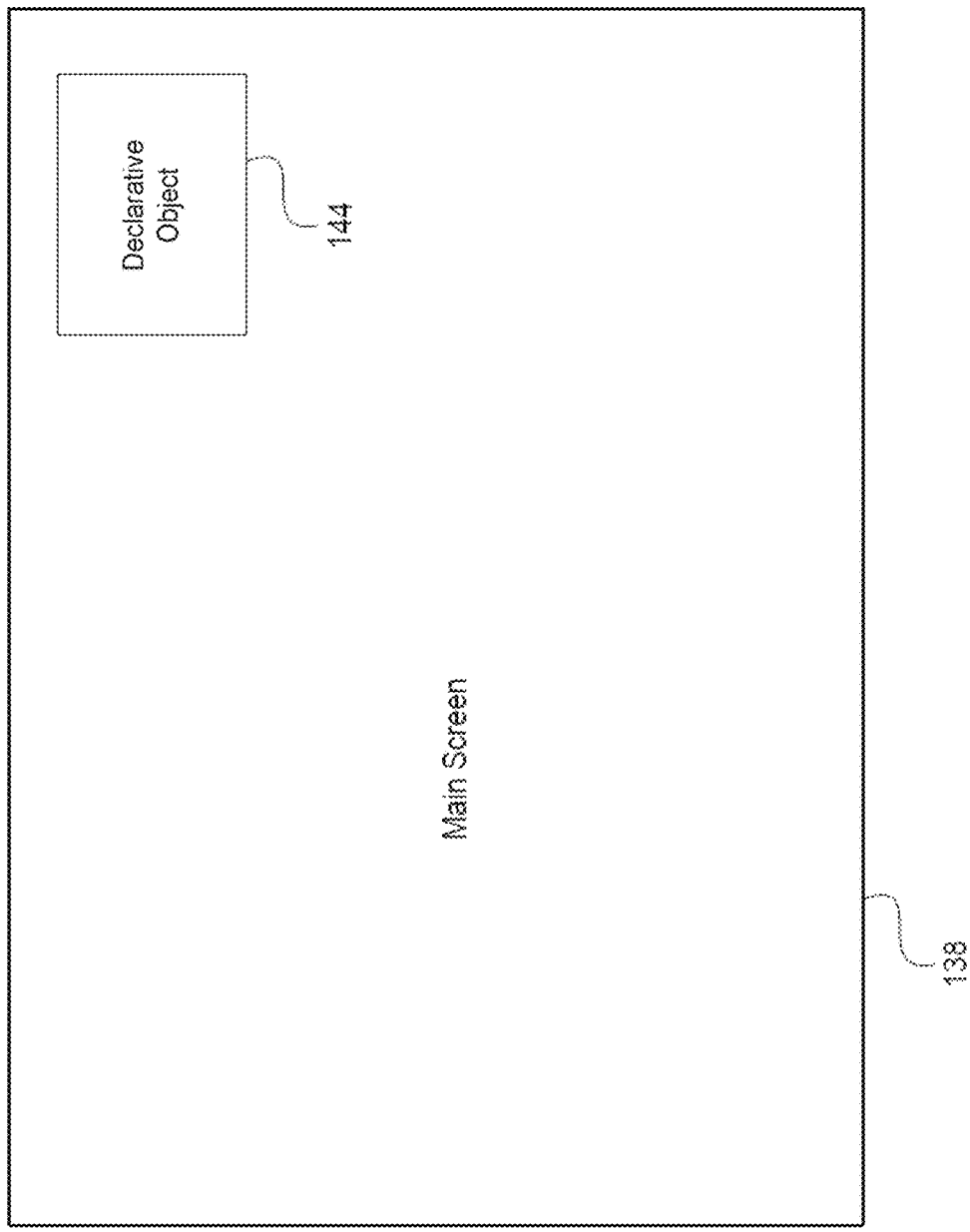
FIG. 1B is a diagram of a display from the television of FIG. 1A, in accordance with one embodiment of the present disclosure.

Referring now to FIG. 1B, a diagram of a display 138 from the television 122 of FIG. 1A is shown, in accordance with one embodiment of the present disclosure. The FIG. 1B embodiment is presented for purposes of illustration, and in alternate embodiments, the display 138 may be implemented using components and configurations in addition to, or instead of, certain of those components and configurations discussed in conjunction with the FIG. 1B embodiment.

In the FIG. 1B embodiment, the display 138 includes a main screen region that typically displays video data provided by the content source 114 (FIG. 1A). In the FIG. 1B embodiment, the display 138 also includes a DO 144 that resides in a discrete area displayed on the display 138 to provide any desired type of additional information. In various different embodiments, the DO 144 may be implemented in any desired shape or size, and may be displayed in any appropriate location. Furthermore, any desired number of different DOs are equally contemplated, including the possibility of multiple DOs on the display at any given time.

In the FIG. 1B embodiment, the display 138 supports synchronized DOs that function to provide information that is related (synchronized) to the video data that is currently being displayed on the display 138. For example, the DO 144 may be utilized to display financial information of specific relevance to the viewer (e.g., his/her investment portfolio) during a television program regarding economic news or investment topics. In another example, the DO 144 may be utilized during a televised automobile race to display relevant information or statistics regarding specific race car drivers, racecars, or automobile racing in general.

Figure 2A:
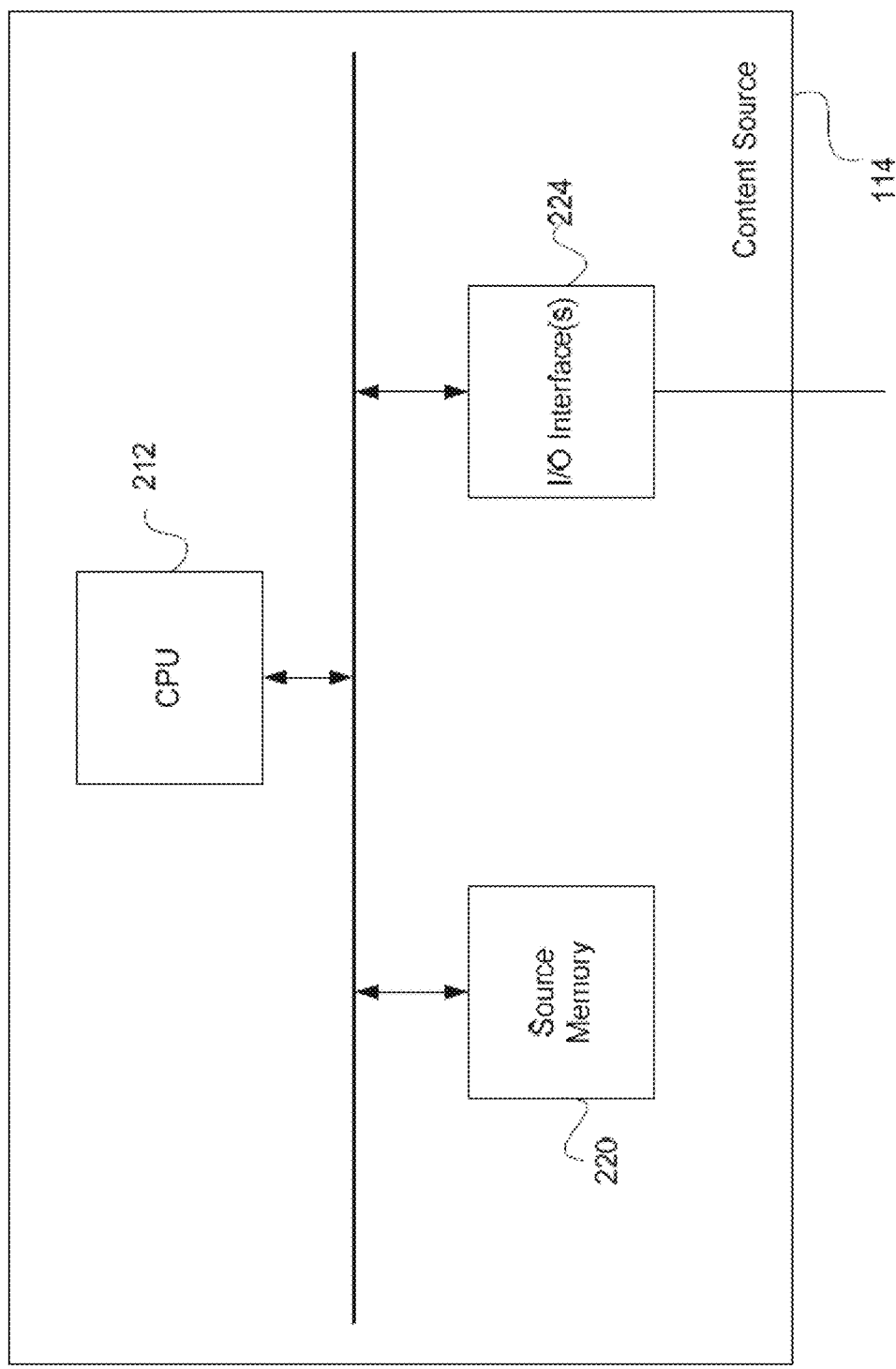
FIG. 2A is a block diagram for one embodiment of the content source of FIG. 1A, in accordance with the present disclosure.

Referring now to FIG. 2A, a block diagram for one embodiment of the FIG. 1A content source 114 is shown, in accordance with the present disclosure. In the FIG. 2A embodiment, the content source 114 may include, but is not limited to, a central processing unit (CPU) 212, a source memory 220, and input/output interfaces (I/O interfaces) 224. In alternate embodiments, the content source 114 may be implemented using components and configurations in addition to, or instead of, those components and configurations discussed in conjunction with the FIG. 2A embodiment. In addition, the content source 114 may alternately be implemented as any other desired type of electronic device or entity.

In the FIG. 2A embodiment, the CPU 212 may be implemented to include any appropriate and compatible microprocessor device(s) that preferably execute software instructions to thereby control and manage the operation of the content source 114. In the FIG. 2A embodiment, the source memory 220 may be implemented to include any combination of desired storage devices, including, but not limited to, read-only memory (ROM), random-access memory (RAM), and various types of non-volatile memory, such as floppy disks or hard disks. The contents and functionality of the source memory 220 are further discussed below in conjunction with FIGS. 3 and 4.

In the FIG. 2A embodiment, the I/O interfaces 224 may include one or more input and/or output interfaces to receive and/or transmit any required types of information for the content source 114. For example, in the FIG. 2A embodiment, the content source 114 may utilize the I/O interfaces 224 to communicate with other entities in the electronic system 110 (FIG. 1A). Furthermore, a system user may utilize the I/O interfaces 224 to communicate with the content source 114 by utilizing any appropriate and effective techniques. Additional details regarding the content source 114 are further discussed below in conjunction with FIGS. 2B, 3-4.

Figure 2B:
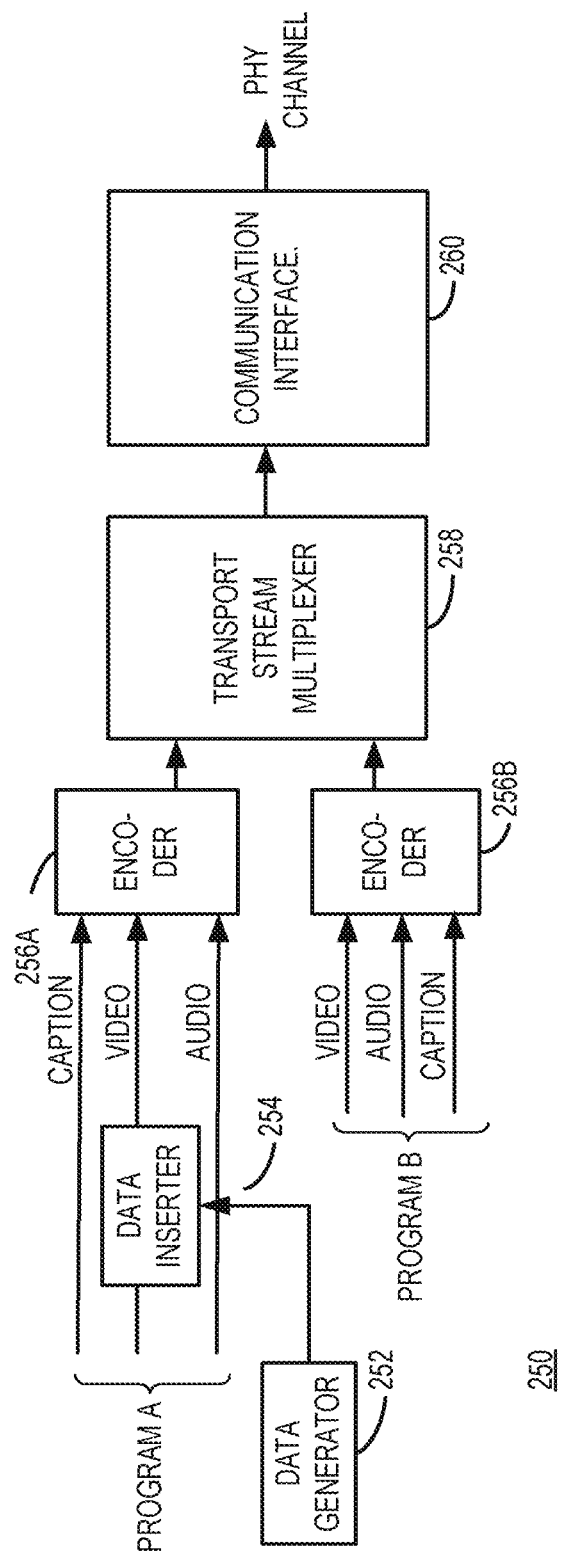
FIG. 2B illustrates an exemplary information providing apparatus that is implemented at the content source, in accordance with an embodiment of the present disclosure.

FIG. 2B illustrates an exemplary information providing apparatus 250, which is for example utilized by the content source 114 to provide an image in which a plurality of symbols, including one or a combination of a run-in pattern, one or more parameters used to recover values of the plurality of symbols, and other digital data (e.g., metadata, application data, program guide data, closed caption data, etc.), is encoded. Generally speaking, a single content provider may provide multiple programs (e.g. Programs A and B) over one or more transport streams. For example, audio, video, and caption data for Program A are provided to an encoder 256A while audio, video, and caption data for Program B are provided to an encoder 256B. A transport stream multiplexer 258 receives the outputs from the encoders 256A, 256B and provides an output that can be distributed via a physical channel medium such as a terrestrial, cable, or satellite broadcast. A communication interface 260 (e.g., a terrestrial broadcast transmitter) distributes the output from the transport stream multiplexer 258 via the physical channel medium.

The information providing apparatus 250 further includes a digital data generator 252 and digital data inserter 254. The digital data generator 1102 generates digital data to be embedded in the video portions of Program A.

The digital data inserter 254 embeds the generated digital data in the video portions of Program A. In certain embodiments, the digital data inserter 254 also embeds a predetermined run-in pattern which indicates that digital data has been embedded in the video portion. Further, the digital data inserter 254 optionally embeds parameters (e.g., one or more luminance values used for encoding symbols, one or more slice points, etc.) for a reception apparatus 550 (as illustrated in FIG. 5B for example) to use to recover the embedded digital data.

In certain embodiments, the digital data inserter 254 encodes the generated digital data within luminance values in one or more lines (e.g., lines 1 and optionally line 2) of active video. The digital data inserter 252 encodes each of the digital data in a different frame, or each of the one or more lines, of the video. As described above, the digital data may be repeated for a predetermined number of frames.

The digital data inserter 254 optionally repeats the encoding of the generated metadata in line 2 for better robustness due to errors that may be introduced in encoding or re-encoding. Due to the nature of video encoding, the integrity of metadata on line 1 has been found to be improved if the same data is repeated on line 2. Additionally, other lines such as the last 1 or 2 lines may be used to repeat the same data.

Figure 3:
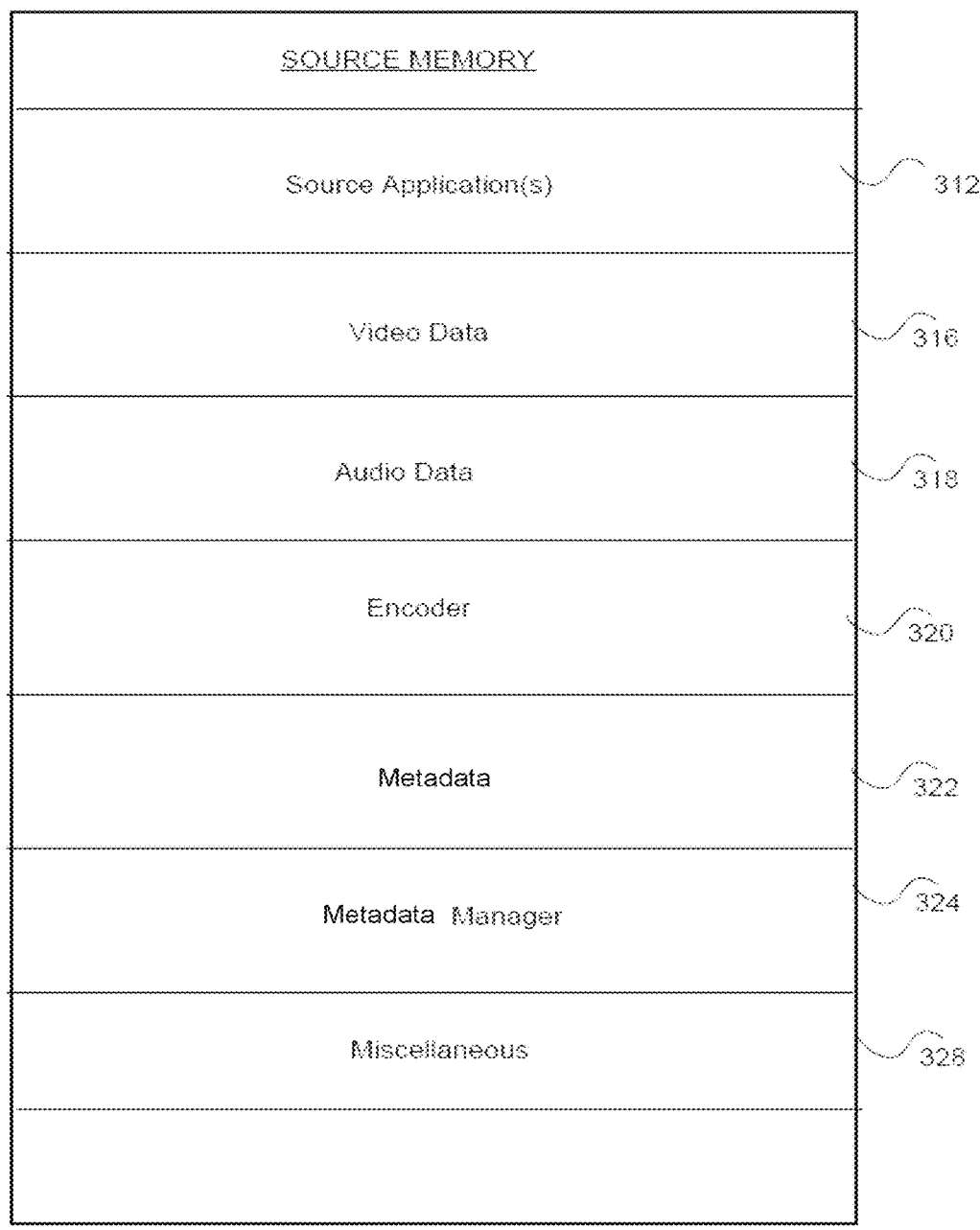
FIG. 3 is a block diagram for one embodiment of the source memory of the content source, in accordance with the present disclosure.

Referring now to FIG. 3, a block diagram for one embodiment of the FIG. 2A source memory 220 is shown, in accordance with the present disclosure. In the FIG. 3 embodiment, the source memory 220 includes, but is not limited to, one or more source applications 312, video data 316, audio data 318, an encoder 320, metadata 322, a metadata manager 324, and miscellaneous information 328. In alternate embodiments, the source memory 220 may include components in addition to, or instead of, those components discussed in conjunction with the FIG. 3 embodiment.

In the FIG. 3 embodiment, the source application(s) 312 may include program instructions that are preferably executed by the CPU 212 (FIG. 2A) to perform various functions and operations for the content source 114, including for example control and/or implementation of the information providing apparatus 250. The particular nature and functionality of the source application(s) 312 preferably varies depending upon factors such as the specific type and particular functionality of the corresponding content source 114. In the FIG. 3 embodiment, the video data 316 may include any appropriate information or data for display on, or for processing within, the television 122 (FIG. 1A). Similarly, the audio data 318 may include any appropriate information or data for reproduction by television 122 (FIG. 1A).

In the FIG. 3 embodiment, the encoder 320 is configured to convert the video data 316 and the audio data 318 into a compressed distribution multiplex for distribution to television 122. In the FIG. 3 embodiment, the metadata manager 324 coordinates and manages various functions for creating the metadata 322 (or other digital data), and embedding the metadata 322 as an integral part of the video data 316, in accordance with the present disclosure. The miscellaneous information 328 may include any additional information for utilization by the content source 114.

In the FIG. 3 embodiment, the present disclosure is disclosed and discussed as being implemented primarily as software. However, in alternate embodiments, some or all of the functions of the present disclosure may be performed by appropriate electronic hardware circuits that are configured for performing various functions that are equivalent to those functions of the software modules discussed herein. Additional details regarding the functionality of the metadata manager 324 and the metadata 322 are further discussed below.

Figure 4:
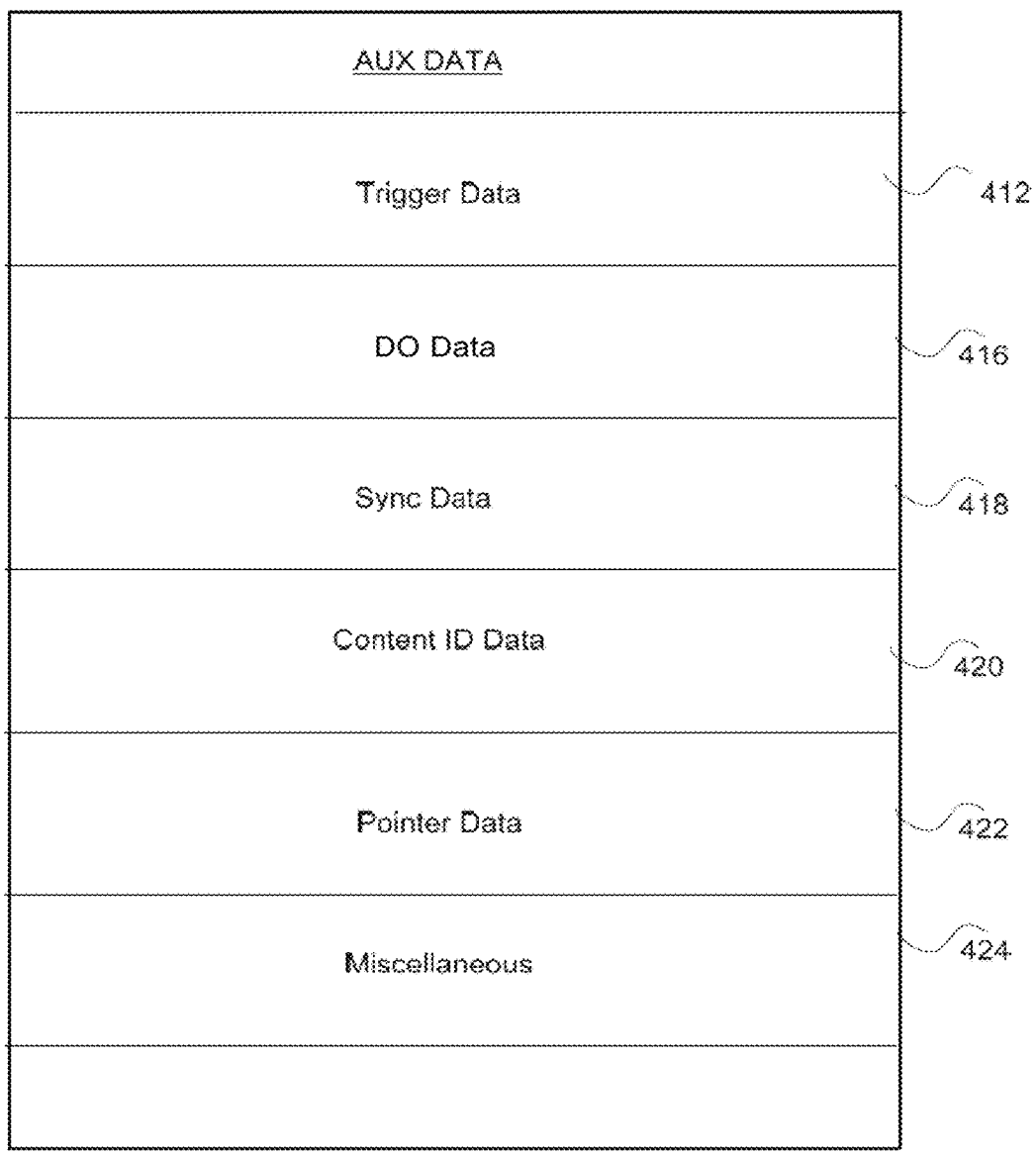
FIG. 4 is a block diagram for one embodiment of the metadata stored in the source memory, in accordance with the present disclosure.

Referring now to FIG. 4, a block diagram of the FIG. 3 metadata 322 is shown, in accordance with one embodiment of the present disclosure. In the FIG. 4 embodiment, the metadata 322 may include, but is not limited to, trigger data 412, DO content 416, synchronization (sync) data 418, content identification (ID) data 420, pointer data 422, and miscellaneous information 424. In alternate embodiments, the metadata 322 may be implemented using various components and functionalities in addition to, or instead of, those components and functionalities discussed in conjunction with the FIG. 4 embodiment.

In the FIG. 4 embodiment, trigger data 412 may include any type of information for controlling processes related to the DO 144 (FIG. 1B). For example, the trigger data 412 may include, but is not limited to, data that defines the DO 144 with respect to visual appearance and behavior, information presented by a DO (such as readout values), DO graphical states (such as colors, levels, or settings), and optimal DO location, shape, size, and display times. In certain embodiments, the trigger data 412 contains one or more triggers that perform various timing-related signaling functions in support of interactive services, as defined in ATSC Candidate Standard A/105:2014, as referenced above.

In one embodiment, the trigger can be considered to include three parts, two being required and the third being optional: <domain name part>/<directory path>[?<parameters>]. The <domain name part> references a registered Internet domain name. The <directory path> is an arbitrary character string identifying a directory path under the control and management of the entity who owns rights to the identified domain name. In the TDO model, the combination of <domain name part> and <directory path> shall uniquely identify a TPT that can be processed by a receiver to add interactivity to the associated content. In the direct execution model, the combination of <domain name part> and <directory path> shall uniquely identify the DO to be launched. The <parameters> portion of the Trigger is optional. When present, it can convey one or more parameters associated with the trigger. An exemplary trigger is xbc.tv/e12.

The trigger is a data object, which is optionally bound to a particular item or segment of content (e.g., a television program) that references a specific TDO instance, by the use of a file name or identifier for an object that has already been or is to be downloaded. Certain TDOs will only make sense in conjunction with certain content. An example is a TDO that collects viewer response data, such as voting on a game show or contest.

In the FIG. 4 embodiment, the DO content 416 may include any content data for display in the DO 144. In certain embodiments. The DO content 416 may alternately be obtained from sources or entities other than the metadata 322. DOs may include discrete areas that are displayed on the television 122 to provide any desired type of information. Additional details regarding the DOs are further provided above in conjunction with FIG. 1B. In the FIG. 1A embodiment, the electronic system 110 advantageously supports synchronized DOs that provide information that is related to (synchronized) to the main content data that is currently being displayed on television 122. In order to successfully support synchronized DOs (e.g., triggered declarative objects (TDOs)), the electronic system 110 also provides certain types of metadata (e.g., triggers, TDO Parameters Table, etc.) to the television 122.

A TDO is a downloadable software object created by a content provider, content creator, or other service provider types, which includes declarative content (e.g., text, graphics, descriptive markup, scripts, and/or audio) whose function is tied in some way to the content it accompanies. An embodiment of the TDO is described in the ATSC Candidate Standard A/105:2014. However, the TDO is not limited to the structure described in the ATSC Candidate Standard since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player (e.g., the DO Engine) supports a scripting language that is an object-oriented programming language (e.g., JavaScript). The TDOs, in examples shown herein, are received from a content or service provider, via for example the server 130, in advance of the time they are executed so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

The TPT contains metadata about a TDO of a content segment and defines one or more events for the TDO. The events of the TDO may be triggered based on a current timing of the content being reproduced or by a reference to one or more events contained in one or more triggers. For example, one or more parameters associated with a trigger may be provided to the reception apparatus 550 in the TPT.

While a trigger indicates that the time is right for the TDO to perform a certain action, a series of timed actions can be played out without a trigger, for example by using the TPT. The TPT, or a separate Activation Messages Table (AMT) optionally provides timing information for various interactive events relative to "media time." Each item of interactive content has a timeline for its play out; an instant of time on this timeline is called media time. For example, a 30-minute program may have an interactive event at media time ten minutes, 41 seconds, and 2 frames from the beginning of the program, or media time 10:41+02. The TPT can include an entry indicating the details of the event that is to occur at time 10:41+02. Once the reception apparatus 550 determines the current timing relative to the start of the program, it can use the TPT, and optionally the AMT, to play out all subsequent events.

In the FIG. 4 embodiment, the synchronization (sync) data 418 may include any appropriate means for allowing the television 122 to detect the metadata 322 while it is embedded in video data 316. In certain embodiments, the sync data 418 may include a pre-defined identification pattern (e.g., a predetermined run-in pattern) that indicates the presence, and in one embodiment, a specific location, of the metadata 322 within video data 316. Metadata may be encoded within video by use of modulation of the luminance (brightness) value of the video. For example, on one video line, each set of a predetermined number of pixels (e.g., 8) may correspond to one "symbol," wherein the luminance value of each pixel is set to one of four values. In this case, each symbol carries two bits of information. In other embodiments, each set of pixels may be set to one of two levels. In that case, each set would carry one bit of information.

In one embodiment, a predetermined number of symbols (e.g., 8 or 16) is used to define a predetermined run-in pattern that is used to indicate whether a video frame is marked. For example, the first eight symbols may be set to a fixed pattern, [3, 3, 0, 0, 2, 1, 3, 0], to allow a detector to quickly identify whether or not the video includes a watermark. When each symbol corresponds to 1-bit, the fixed pattern could be [1, 1, 1, 1, 0, 0, 0, 0, 1, 0, 0, 1, 0, 1, 1, 0] and, in certain embodiments, the number of symbols is increased (e.g., to 16). Further, different run-in patterns may be used for different protocol versions such that backwards compatibility may be achieved by assuring that implementations of the 1.0 version discard any data not including the version 1.0 run-in pattern.

In the FIG. 4 embodiment, the content ID data 420 may include any appropriate information for identifying the specific content of a given corresponding program. In one embodiment, the content ID data 420 may include an International Standard Audio-Visual Number (ISAN) number as an identifier. In another embodiment, the content ID data 420 may include an Entertainment Industry Data Registry (EIDR) code and/or a media time. For example, the content ID data 420 may include a content ID message that is designed to carry a 12-byte EIDR code and a 2-byte media time. Exemplary bitstream syntax of the Content ID message is as follows:

| Syntax | No. of Bits | Format |
| --- | --- | --- |
| content_id_message( ) { | | |
| table_id | 8 | 0x01 |
| table_length | 8 | uimsbf |
| EIDR | 96 | uimsbf |
| media_time | 16 | uimsbf |
| CRC_32 | 32 | uimsbf |
| } | | | table_id—Set to value 0x01. Identifies the data to follow as a content_id_message( ).

table_length—Indicates the number of bytes to follow to the end of the CRC. In this case the value is 18.

EIDR—A 96-bit value intended to carry the value of the Entertainment Industry Data Registry (EIDR) code for this content item.

media_time—A 16-bit number representing the media time within the content in seconds, where value zero indicates the first second of the content item.

CRC_32—A 32-bit CRC checksum over the full message, up to but not including the CRC_32 field itself. An exemplary generating polynomial is $1+x+x^2+x^4+x^5+x^7+x^8+x^{10}+x^{11}+x^{12}+x^{16}+x^{22}+x^{23}+x^{26}$.

In one embodiment, the content ID message may further, or alternatively, include an Ad-ID field for commercial material. The Ad-Id field is a 96-bit field that represents the Ad-ID code associated with the content.

In the FIG. 4 embodiment, the pointer data 422 may include any type of required information that television 122 utilizes to locate and obtain additional information (such as DO content or trigger data) for using in producing the synchronized DOs 144. For example, the pointer data 422 may include, but is not limited to, a URL that identifies an Internet location where more information pertaining to the currently-displayed video data 316 may be found. The URL could represent a website on the server 130 (FIG. 1A) or elsewhere providing more information about a product being advertised, a URL of a home page of an episode or series, a website where a viewer could sign up for a service or vote on a program, etc.

In the FIG. 4 embodiment, the miscellaneous information 424 may include any additional information for utilization by the television 122. For example, in certain embodiments, the miscellaneous information 424 may include one or more scripts or executable programs. In one embodiment, the miscellaneous information 424 includes a frame count message. The purpose of the frame count message is to provide finer granularity to the timing given in the media time field of the Content ID message, and to indicate the original frame rate of the content (at the time the watermark was applied). Exemplary bit stream syntax of the frame count message is as follows:

| Syntax | No. of Bits | Format |
| --- | --- | --- |
| frame_count_message( ) { | | |
| table_id | 8 | 0x02 |
| table_length | 8 | uimsbf |
| original_frame_rate | 8 | uimsbf |
| frame | 8 | uimsbf |
| CRC_32 | 32 | uimsbf |
| } | | | table_id—Set to value 0x02. Identifies the data to follow as a frame count message( ).

table_length—Indicates the number of bytes to follow. In this case the value was set to 6.

original_frame_rate—An 8-bit unsigned integer indicating the frame rate, in frames per second, of the original content at the time the watermark is applied. The value is set to 24 for animated content and 30 for other content types.

frame—An 8-bit unsigned integer indicating the frame number within the one-second period identified by media time. The count is zero-based.

CRC_32—A 32-bit CRC checksum over the full message, up to but not including the CRC_32 field itself. An exemplary generating polynomial is $1+x+x^2+x^4+x^5+x^7+x^8+x^{10}+x^{11}+x^{12}+x^{16}+x^{22}+x^{23}+x^{26}$.

Additional details regarding the creation, distribution, and utilization of the metadata 322 are further discussed below.

Figure 5A:
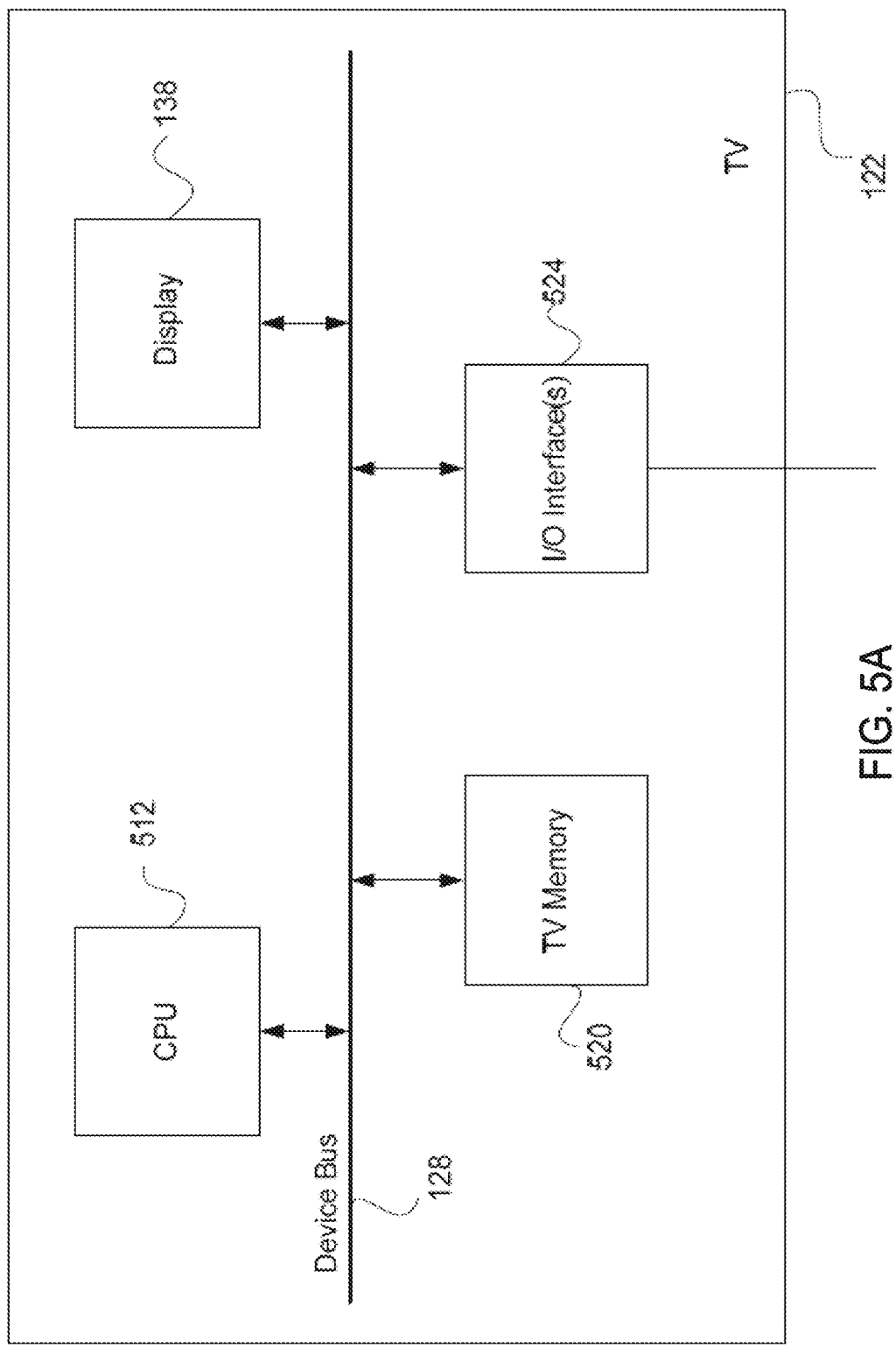
Figure 5B:
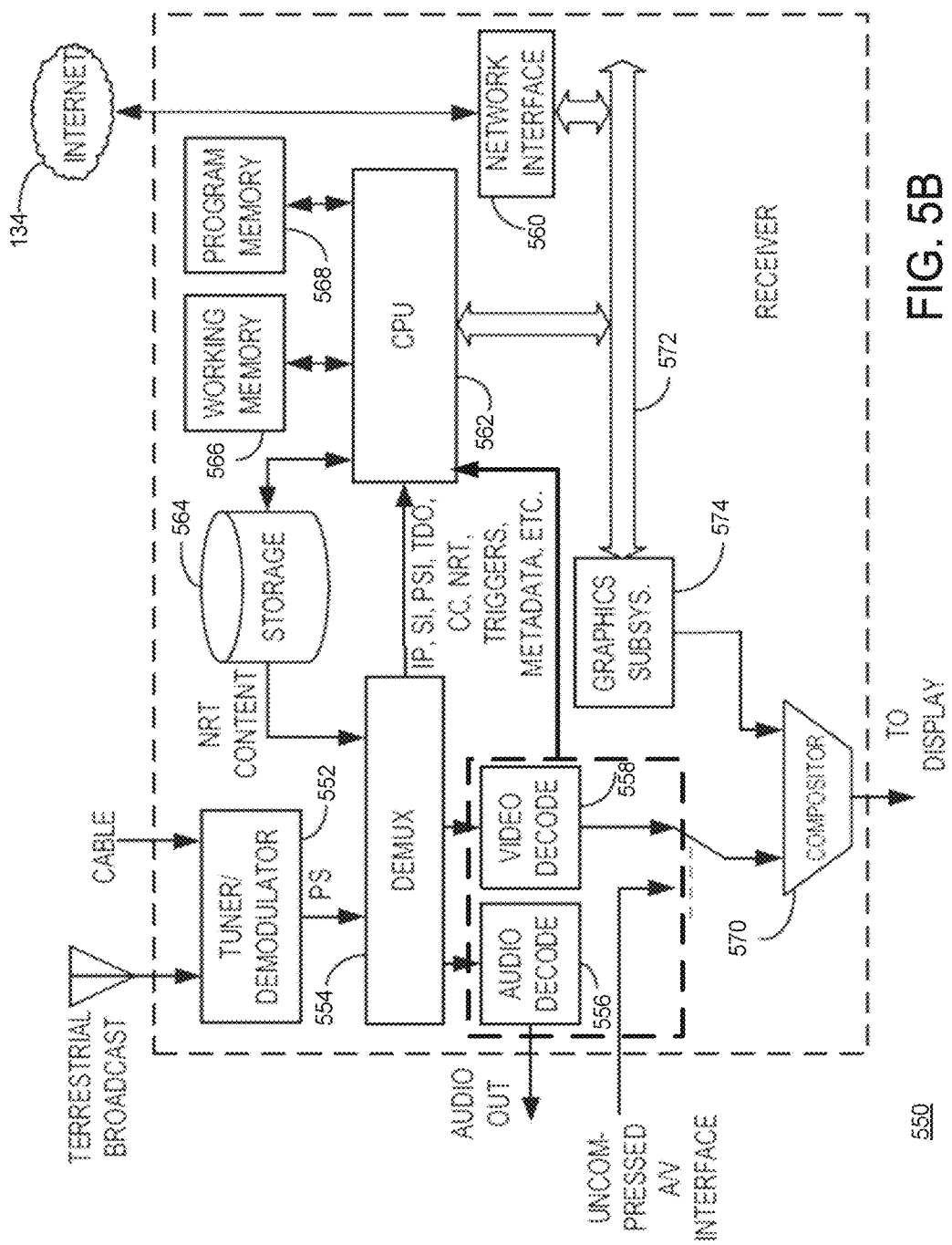

Referring now to FIG. 5A, a block diagram for one embodiment of the FIG. 1A television (TV) 122 is shown, in accordance with the present disclosure. In the FIG. 5A embodiment, the TV 122 may include, but is not limited to, a central processing unit (CPU) 512, a display 138, a TV memory 520, and input/output interfaces (I/O interfaces)

524. In alternate embodiments, the TV 122 may be implemented using components and configurations in addition to, or instead of, those components and configurations discussed in conjunction with the FIG. 5A embodiment. In addition, the TV 122 may alternately be implemented as any other desired type of electronic device or entity.

In the FIG. 5A embodiment, the CPU 512 may be implemented to include any appropriate and compatible microprocessor device(s) that preferably execute software instructions to thereby control and manage the operation of the TV 122. The FIG. 5 display 138 may include any effective type of display technology including an organic light-emitting diode or a liquid-crystal display device with an appropriate screen for displaying various information to a device user. In the FIG. 5A embodiment, the TV memory 520 may be implemented to include any combination of desired storage devices, including, but not limited to, read-only memory (ROM), random-access memory (RAM), and various types of non-volatile memory, such as floppy disks or hard disks. The contents and functionality of TV memory 520 are further discussed below in conjunction with FIG. 6.

In the FIG. 5A embodiment, the I/O interfaces 524 may include one or more input and/or output interfaces to receive and/or transmit any required types of information for the TV 122. For example, in the FIG. 5A embodiment, the TV 122 may utilize the I/O interfaces 524 to communicate with other entities in the electronic system 110 (FIG. 1A). Furthermore, a system user may utilize I/O interfaces 524 to communicate with the TV 122 by utilizing any appropriate and effective techniques. Additional details regarding the TV 122 are further discussed below.

FIG. 5B is a block diagram of a reception apparatus 550 that is incorporated in the TV 122 according to one embodiment. The reception apparatus 550 is a digital television receiver device that may be incorporated into the TV 122 or the set top box 118. The reception apparatus 550 includes a tuner/demodulator 552, which receives content from one or more content providers such as a terrestrial broadcast or a cable television transmission. The reception apparatus 550 may also, or alternatively, receive content from a satellite broadcast. The tuner/demodulator 552 receives a packet stream (PS) such as a transport stream (TS) or IP packet stream, which is demultiplexed by the demultiplexer 554 into audio and video (A/V) streams. Exemplary IP packet streams are described in the ATSC Mobile DTV standard ATSC-M/H (A/153) and the Enhanced Multicast Multimedia Broadcast (eMBMS) standard, which are incorporated herein by reference in their entirety. The audio is decoded by an audio decoder 556 and the video is decoded by a video decoder 558. Further, uncompressed A/V data may be received via an uncompressed A/V interface (e.g., a HDMI interface) that can be selectively utilized. The uncompressed A/V data may be received from a set-top box, digital video recorder, DVD player, or any other consumer electronics device connected to the reception apparatus 550 via the uncompressed A/V interface.

The TS may include ancillary information such as one or more of caption data, TDOs, triggers, TPTs, content identifiers, and other metadata. One or more of the A/V content and/or the ancillary information may also be received via the communication network (e.g., Internet) 134 and a network interface 560. In certain embodiments, ancillary information such as one or a combination of the triggers, content identifiers, caption data, or other metadata is embedded, or otherwise inserted, in the video portion of the A/V content, as symbols. A CPU 562 extracts the ancillary information from the video portion of the A/V content and performs one or more processes based on the extracted ancillary information.

A storage unit 564 is provided to store NRT, recorded content, or Internet-delivered content such as Internet Protocol Television (IPTV). The stored or recorded content can be played by demultiplexing the content stored in the storage unit 564 by the demultiplexer 554 in a manner similar to that of other sources of content. The storage unit 564 may also store one or more TDOs, triggers, and TPTs acquired by the reception apparatus 550.

The reception apparatus 550 generally operates under control of at least one processor, such as the CPU 562, which is coupled to a working memory 566, program memory 568, and a graphics subsystem 574 via one or more buses (e.g., bus 572). The CPU 562 may receive closed caption data from the demultiplexer 554 as well as any other information such as TDO announcements and EPGs used for rendering graphics, and passes the information to the graphics subsystem 574. Graphics outputted by the graphics subsystem 574 are combined with video images by the compositor and video interface 568 to produce an output suitable for display on a video display. In one embodiment, the CPU 562 recovers digital data such as the ancillary information encoded in the video portion of the A/V content by receiving an image from the video decoder 558.

Further, the CPU 562 operates to carry out functions of the reception apparatus 550 including the processing of related triggers, TDOs, TPTs, browser operations, metadata, extracting digital data embedded in the image, etc. The browser operations include accessing a service specified by a URL given by the TDO or trigger. The CPU 550 further operates to execute script objects (control objects) contained in the TDO, its trigger(s), etc., using for example DO Engine 584 illustrated in FIG. 5C.

Although not illustrated in FIG. 5B, the CPU 562 may be coupled to any one or a combination of the reception apparatus 550 resources to centralize control of one or more functions. In one embodiment, the CPU 562 also operates to oversee control of the reception apparatus 550 including the tuner/demodulator 552 and other television resources.

A more processor-centric view of the reception apparatus 550 is illustrated in FIG. 5C. Memory and storage 564, 566, 568 are depicted collectively as memory 582. Further, a processor 580 includes one or more processing units such as CPU 562. Similarly, the various demodulators, decoders, etc., that initially process digital television signals are collectively depicted as television receiver/tuner 590. The reception apparatus 550 further includes a remote controller 598 which communicates with a remote controller receiver interface 596. Additionally, the display 594 is connected to a display interface 592, which includes for example the uncompressed A/V interface and/or compositor 570, and is either a display integral to the reception apparatus 550 as in a television set or a connected display device as in the case where the reception apparatus 550 is integrated into the set-top box 118.

Memory 582 contains various functional program modules and data. The memory 582 stores the data used by the reception apparatus 550. The memory 582 within the reception apparatus 550 can be implemented using disc storage form as well as other forms of storage such as non-transitory storage devices including for example network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

When a TDO 586 is received, the TDO 586 is stored in the memory 582. The TDO execution is carried out by a DO Engine 584. The TDO, when executed by the DO Engine 584 presents auxiliary content based on one or more triggers associated with the TDO. The memory 582 also stores a TPT 568, which in one embodiment, defines one or more parameters for each trigger associated with the TDO.

Figure 6:
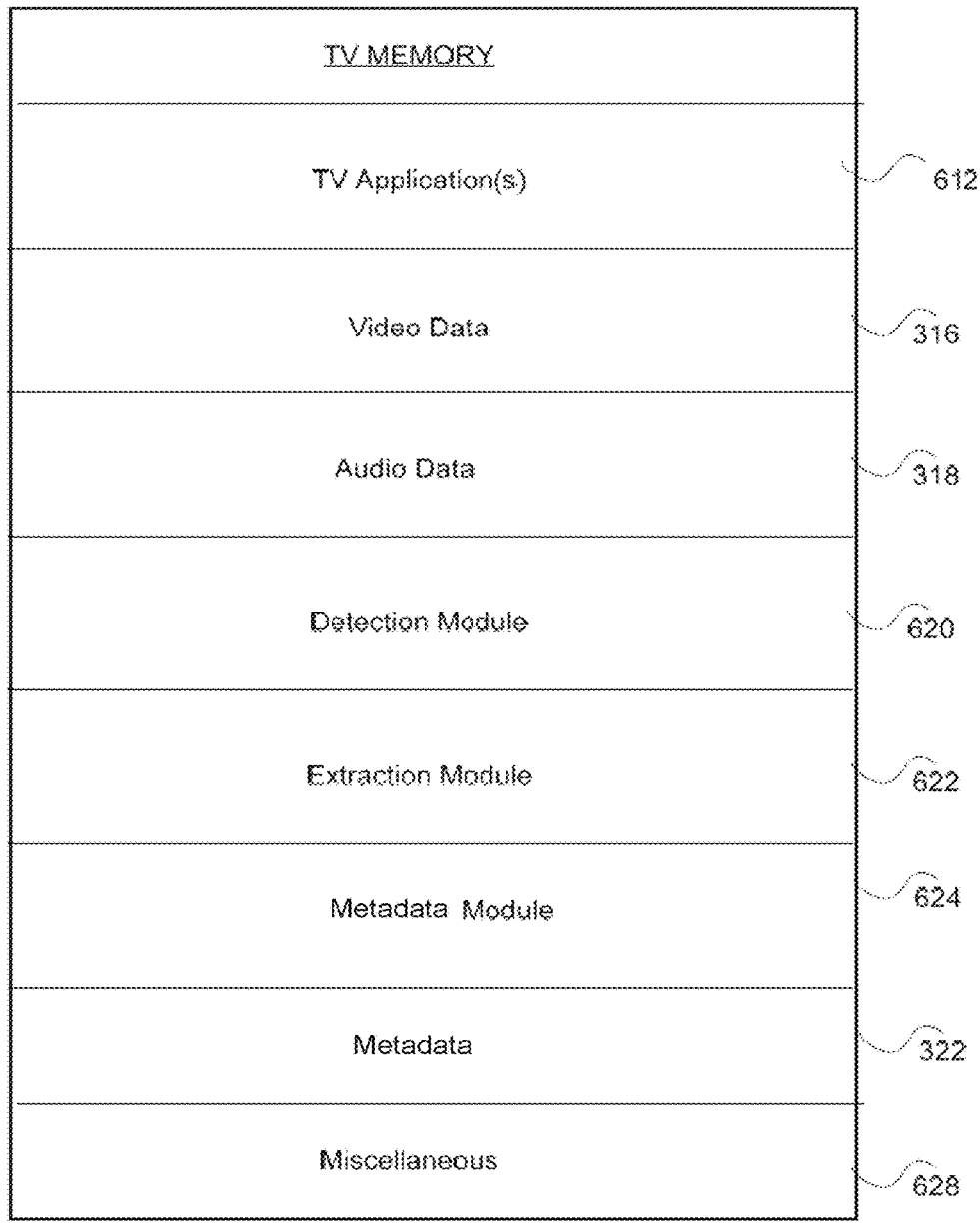
FIG. 6 is a block diagram for one embodiment of the TV memory from FIG. 5A, in accordance with the present disclosure.

Referring now to FIG. 6, a block diagram for one embodiment of the FIG. 5A TV memory 520 is shown, in accordance with the present disclosure. In the FIG. 6 embodiment, the TV memory 520 includes, but is not limited to, one or more TV applications 612, video data 316, audio data 318, a detection module 620, and extraction module 622, a metadata module 624, metadata 322, and miscellaneous information 628. In alternate embodiments, the TV memory 520 may include components in addition to, or instead of, those components discussed in conjunction with the FIG. 6 embodiment.

In the FIG. 6 embodiment, the TV application(s) 312 may include program instructions that are preferably executed by the CPU 512 (FIG. 5A) to perform various functions and operations for the TV 122. The particular nature and functionality of the TV application(s) 612 preferably varies depending upon factors such as the specific type and particular functionality of the corresponding TV 122. In the FIG. 6 embodiment, the video data 316 may include any appropriate information or data for display on the television 122 (FIG. 1A). Similarly, the audio data 318 may include any appropriate information or data for reproduction by the television 122 (FIG. 1A).

In the FIG. 6 embodiment, the detection module 620 may be utilized by TV 122 to detect and locate the metadata 322 that has been embedded in the video data 316, as discussed above. In the FIG. 6 embodiment, the extraction module 620 may be utilized by the TV 122 to remove the detected metadata 322 from the video data 316. In the FIG. 3 embodiment, the metadata module 624 coordinates and manages various functions for processing the extracted metadata 322 to effectively support synchronized DOs 144 (FIG. 1B) or other TV applications, in accordance with the present disclosure. The miscellaneous information 628 may include any additional information for utilization by the TV 122.

In the FIG. 6 embodiment, the present disclosure is disclosed and discussed as being implemented primarily as software. However, in alternate embodiments, some or all of the functions of the present disclosure may be performed by appropriate electronic hardware circuits that are configured for performing various functions that are equivalent to those functions of the software modules discussed herein. Additional details regarding the functionality of the metadata module 324 and metadata 322 are further discussed below in conjunction with FIGS. 7 and 8.

Embodiments of the present disclosure embed the metadata 322, and/or other digital data, as a watermark using luminance values of a video frame. The luminance values are bound within the range [16, 235] decimal. The luminance value 16 corresponds to black and the luminance value 235 corresponds to white, as defined in ITU-R Recommendation BT.709, which is incorporated herein by reference in its entirety. One watermark data symbol is encoded into M pixels (where M is typically 6, 8, or 16). Each symbol encodes one or more data bits. When one-bit-per-symbol encoding is used, symbol values can be either zero or 100% and a threshold value of 50% luminance is used to distinguish '1' bits from '0' bits. When two-bits-per-symbol coding is used, symbol values can be zero, 33.33%, 66.67%, or 100% luminance, and threshold values of 16.67%, 50%, and 83.33% may be used. Alternatively, lower values of luminance can be used, to reduce visibility. A tradeoff between robustness against heavy compression or video transcoding versus visibility can be made by selection of luminance ranges and values.

Figure 12A:
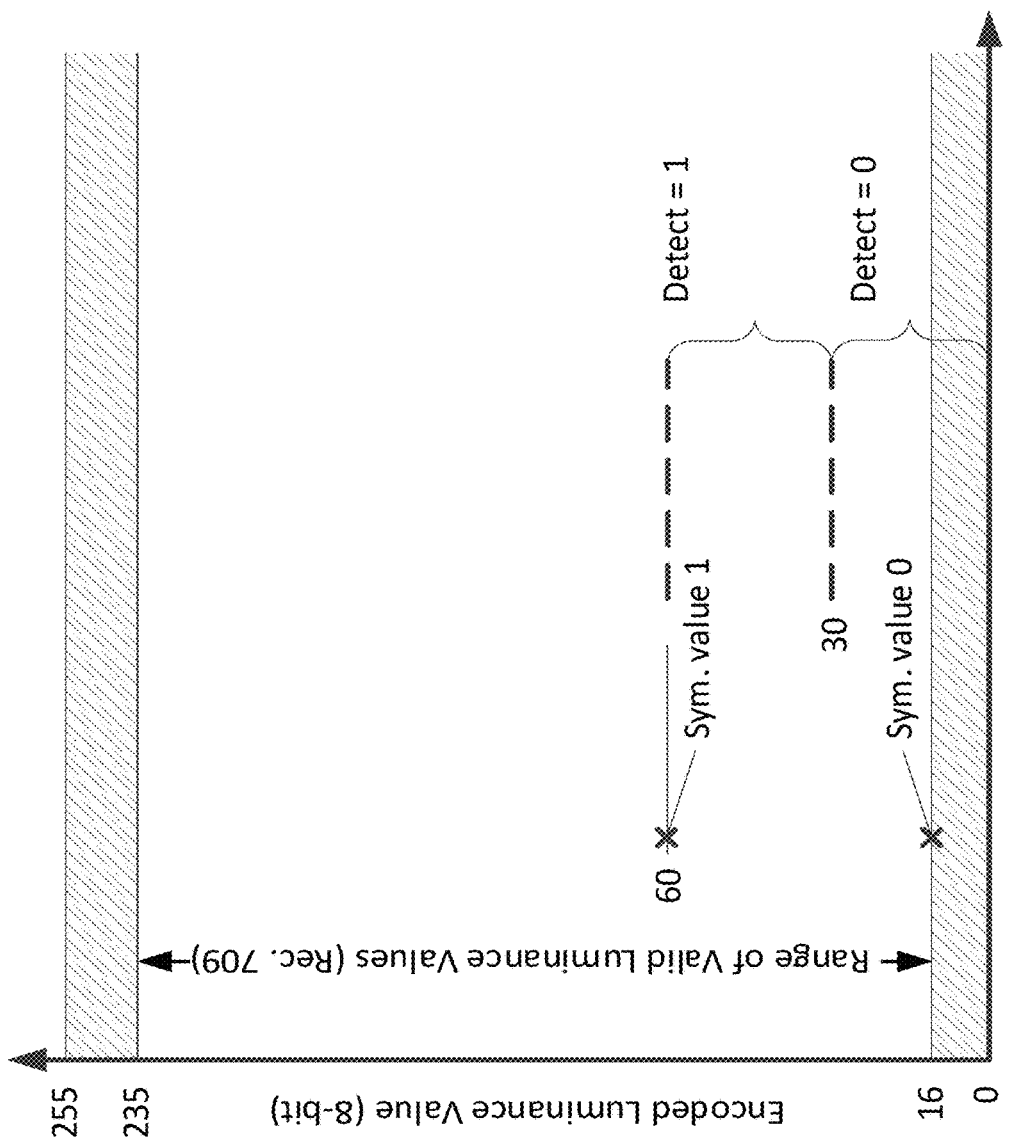
FIGS. 12A and 12B illustrate examples of 1-bit and 2-bit per a symbol luminance encoding.
Figure 12B:
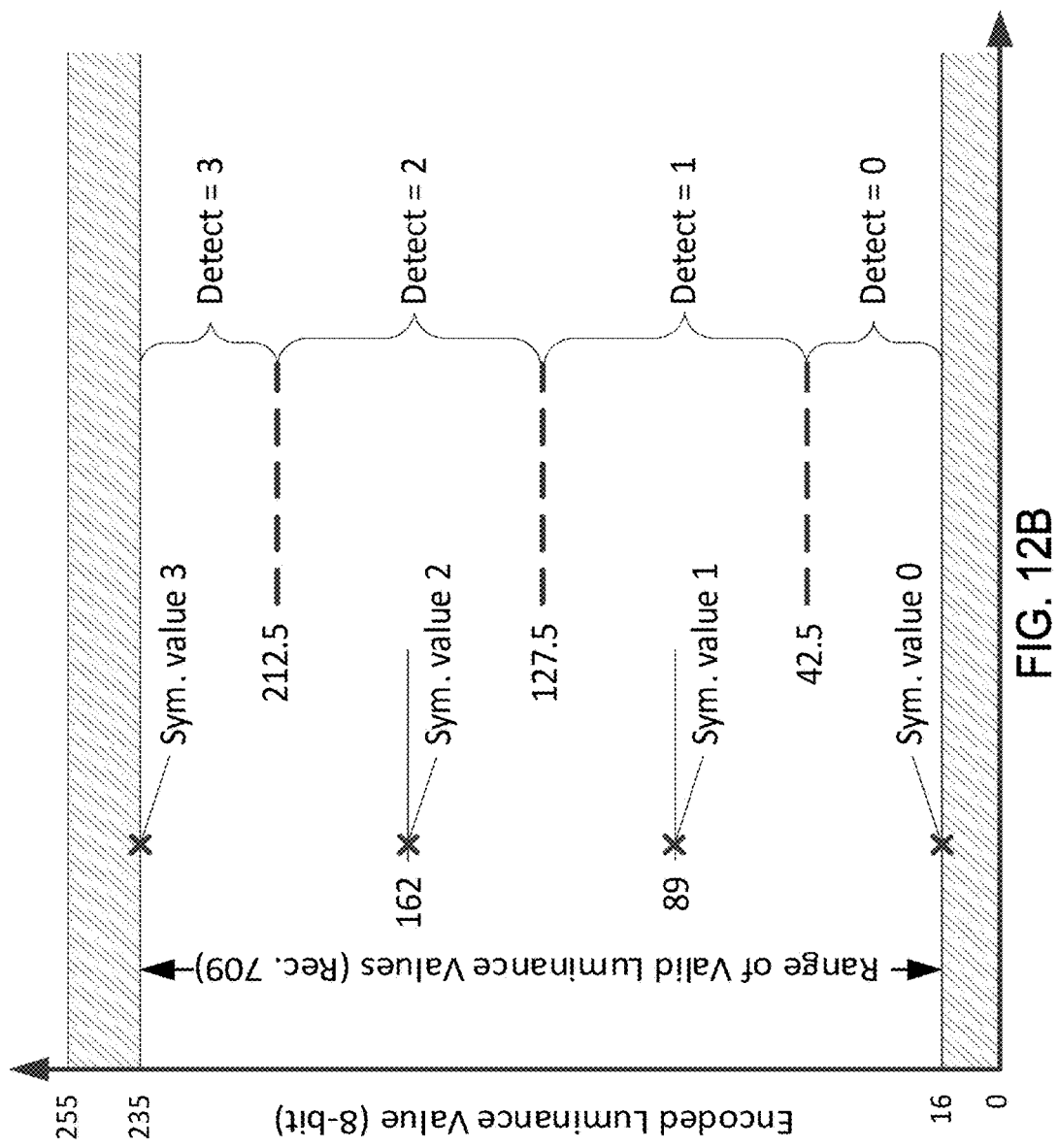

Examples of one-bit and two-bits-per-symbol coding are illustrated in FIGS. 12A and 12B. In FIG. 12A, the symbols representing the watermark data use two luminance values: 0 and 60. In FIG. 12B, the symbols representing the watermark data use four different equally-spaced luminance values: 16, 89, 162, and 235 (decimal). The luminance values are shifted down by 16 such that the first luminance value is 0 in certain embodiments. The threshold values for decoding are shown in FIGS. 12A and 12B. For example, in FIG. 12A, a symbol value 0 is detected if the luminance is less than or equal to 30. Value 1 is detected if the luminance is greater than 30. In FIG. 12B, a symbol value 0 is detected if the luminance is less than or equal to 42, value 1 is detected if the luminance is in the range 43 to 127, value 2 is detected if the luminance is in the range 128 to 212, and value 3 is detected if luminance is 213 or above. While in the majority of cases, televisions do not display the top or bottom few lines of video, a problem which arises from using such a luminance encoding scheme is that the embedded watermark may be visible to a viewer if the portion of the video frame occupied by the watermark is displayed on the TV 122.

To reduce visibility of the watermark, embodiments of the present disclosure use one or a combination of different methods including (1) decreasing the data capacity of the watermark; (2) using a luminance value below "black"; and (3) decreasing the rate that the watermark changes (e.g., once per a second instead of per a frame).

In certain embodiments, metadata is embedded in line 1 of the video data. Video in line 1 consists of N encoded pixels (for RD or UHD content, usually 1280, 1920, or 3840). As noted above, one watermark data symbol is encoded into M pixels (where M is typically 6, 8, or 16). Further, in one embodiment, the same metadata is also embedded in line 2 for better robustness due to errors that may be introduced in encoding or re-encoding. Due to the nature of video encoding, the integrity of metadata on line 1 has been found to be improved if the same data is repeated on line 2.

To reduce visibility of the embedded metadata, in one embodiment, the data capacity of the watermark can be decreased. For example, 60 bytes of data can be encoded per a line, when the number of horizontal pixels per a line is 1920, the number of pixels per a symbol is 8, and the number of bits encoded per symbol is 2. However, in order to encode 2 bits per a symbol, a larger range of luminance values must be used. To decrease the visibility of the watermark, the data capacity of the watermark can be reduced such that the maximum luminance value required to identify a symbol value is decreased, for example from the value 235. For example, luminance values 16 and 89, instead of 16, 89, 162, and 235, could be used to encode the watermark when the number of bits encoded per symbol is reduced to 2, which results in 30 bytes of data being encoded per a line.

In one embodiment, using a luminance value below black decreases visibility of the watermark. Video standards specify that luminance values range from 16 (black) to 235 (white) when encoded as 8 bits. A luminance value of 0 (or any other value below 16) can survive transcoding. Using a minimum luminance value of 0 instead of 16 allows for a reduction in the maximum luminance value needed to encode the watermark and higher robustness. For example, for 2-bit per symbol encoding, the range 16 to 235 can be reduced to 0 to 219 and for 1-bit per symbol encoding, the range 16 to 89 can be reduced to 0 to 73 with no loss in robustness. In one embodiment, the luminance range is set to 0 to 42 for 1-bit per symbol encoding. The luminance value 42 is a level of dark gray that is nearly imperceptible. However, any luminance value range may be set in which the range starts at a value below 16 in certain embodiments. In certain embodiments, luminance values above 235 may be used to increase the range of luminance values used for encoding or shift the range of luminance values to higher values.

In one embodiment, the rate that the watermark changes from frame to frame is decreased to reduce visibility of the watermark embedded in the video data 316. For example, the same watermark may be embedded in a predetermined number of frames, or for a predetermined amount of time (e.g., 1 second) before being changed, instead of being changed once per a frame. Although this reduces the rate at which data is transmitted, decreasing the rate of change reduces possible distraction to a viewer that can result from frequently changing pixel luminance values when the watermark is within a visible area of the display.

The number of horizontal pixels representing one symbol varies depending on horizontal resolution. In one embodiment, 16 pixels per symbol for the 3840 horizontal resolution is utilized to allow the video watermark to be preserved during down-resolution from 4K to 2K.

Figure 7B:
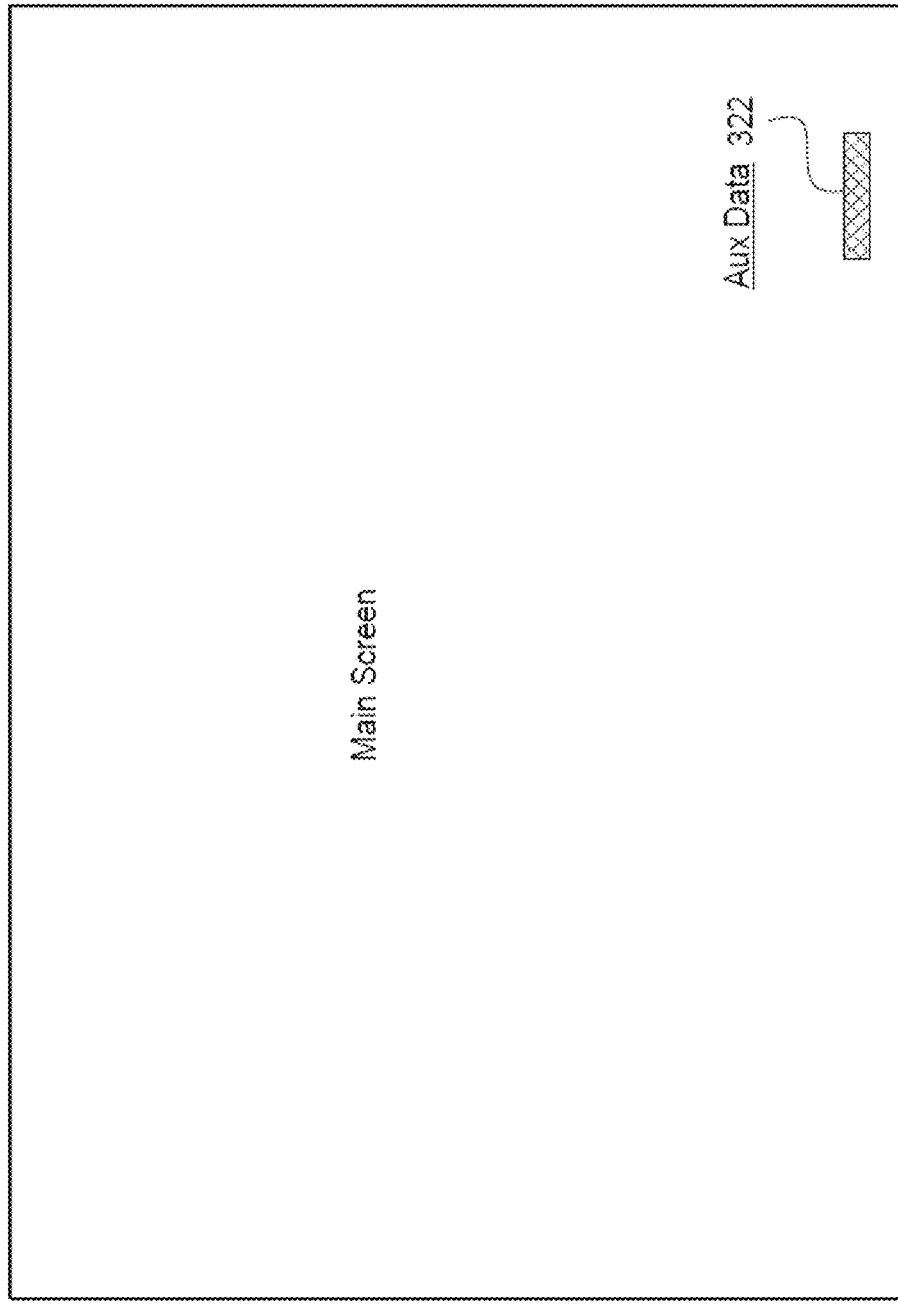

Referring now to FIGS. 7A and 7B, diagrams of digital data (e.g., metadata 322) embedded in video data 316 are shown, in accordance with two different embodiments of the present disclosure. FIGS. 7A and 7B present a frontal view of a display 138 from the TV 122 (FIG. 1A). The embodiments of FIGS. 7A and 7B are presented for purposes of illustration, and in alternate embodiments, the metadata 322 may be embedded using techniques and configurations in addition to, or instead of, certain of those techniques and configurations discussed in conjunction with the embodiments of FIG. 7A and 7B. For example, the digital data may be placed at the bottom of the display in some embodiments.

In the FIG. 7A embodiment, the display 138 includes a main screen region that typically displays the video data 316 provided by the content source 114 (FIG. 1A). In the FIG. 7A embodiment, the displayed video data 316 on the display 138 also includes the digital data that is located in an unobtrusive area of display 138. In various different embodiments, the digital data may be implemented in any desired shape or size, and may be displayed in any appropriate location(s) on the display 138. For purposes of illustration, the metadata 322 in FIG. 7A is depicted as a thin cross-hatched line. However, any effective configuration or appearance is equally contemplated for implementing the metadata 322.

In the FIG. 7A embodiment, the digital data may be encoded to represent the required information (see FIG. 4) in any effective manner. For example, in certain embodiments, the digital data may be formatted as one or more horizontal lines of digital video information positioned in or near the region of the video signal's vertical blanking interval (VBI). Because digital television is often encoded with 1280 to 1920 horizontal pixels per scan line, the FIG. 7A VBI configuration for the metadata 322 may provide a substantial amount of digital information to the TV 122.

The present disclosure thus supports a method of camouflaging the digital data in the video data 316 so that a portion of active video (potentially visible to the viewer) is used to convey the digital data. In addition, the present disclosure includes standardizing an encoding format for the digital data to survive video compression and decompression. The present disclosure further supports embedding the digital data in the video image so that the digital data can be recovered (detected, extracted, and processed by TV 122) in a standardized way, without excessive CPU overhead. The implementation and utilization of the digital data are further discussed below in conjunction with FIGS. 8A-8C and 9-11.

In the FIG. 7B embodiment, the display 138 includes a main screen region that typically displays the video data 316 provided by the content source 114 (FIG. 1A). In the FIG. 7B embodiment, the displayed video data 316 on display 138 also includes the embedded digital data (e.g., metadata 322) that is preferably located in an unobtrusive area of display 138. For example, the digital data may be located at any region of the display that is outside the display area of the video (e.g., a movie that is displayed in a different aspect ratio). In various, different embodiments, the digital data may be implemented in any desired shape or size, and may be displayed in any appropriate location(s) on display 138. For purposes of illustration, the digital data in FIG. 7B is depicted as a small cross-hatched rectangle. However, any effective configuration or appearance is equally contemplated for implementing the embedded digital data.

In the FIG. 7B embodiment, the digital data may be encoded to represent any required information (see FIG. 4) in any effective manner. For example, in certain embodiments, the digital data may be formatted by utilizing conventional or enhanced bar code technologies. In other words, the digital data could be effectively formatted as a video two-dimensional bar code that is embedded in a corner or at the edge of the displayed video data 316. In addition, the bar code or other formatting of the digital data could be displayed as a part of a small graphical logo icon known as a "bug." Furthermore, in various other embodiments, the digital data may encoded or displayed by utilizing any other effective techniques. Such an encoding of the metadata 322 could represent a substantial amount of information, and could be quite small and dense, as the metadata 322 would be read by the TV 122 processing video data 316 in video memory. Where printed barcodes are optimized for readout by laser scanners, the type of video barcode used for the metadata 322 is embedded in a digital video signal, which is processed directly by the TV 122 (as pixel luminance or chrominance samples).

In certain embodiments, quantization errors in the video compression could possibly obliterate a video barcode (so a bar code occurring within a fast-moving, hard-to-compress video sequence might not survive). However, if the bar code is left on-screen for some amount of time (a few seconds), that concern is mitigated. The resulting barcode image may not need to be shown with high contrast (black lines on white background), since TV 122 will be able to extract the information via a filtering mechanism. The bar code could thus be encoded with various shades of gray (as long as there is enough contrast for reliable extraction). For example, the bar code could be displayed using a luminance value below 16, using 1-bit per a symbol encoding, and/or reduced change rates, as described above.

As discussed above, the digital data could be displayed in conjunction with a graphical logo icon ("bug"), as a caption or border, or it could be placed at one more of the extreme edges of the image (because these are usually cropped before display, and are less obtrusive in any case). The bits of the digital data could be spread out spatially over the area of the video frame if the pattern of their location was known to the TV 122 beforehand. Even a small amount of the digital data such as the content ID data 420 or the pointer data 422 of FIG. 4, can be of great help in enhancing the user experience, as this information can be expanded via an interaction with a web server 130 (see FIG. 1A) to obtain additional required information including, but not limited to, the metadata 322 or content data.

Referring now to FIGS. 8A-8C, a flowchart of method steps for distributing the metadata 322, and/or other digital data, embedded in the video data 316 is shown, in accordance with one embodiment of the present disclosure. The FIG. 8 example is presented for purposes of illustration, and in alternate embodiments, the present disclosure may utilize steps and sequences other than certain of those steps and sequences discussed in conjunction with the FIG. 8 embodiment.

In the FIG. 8A embodiment, in step 812, the content source 114 or other appropriate entity initially produces A/V content data that typically includes the video data 316 and the audio data 318. In step 814, the content source 114 or other appropriate entity then creates the metadata 322 to support various advanced interactive features on the television device 122, such as displaying one or more synchronized DOs 144. In step 816, the content source 114 or other appropriate entity inserts the metadata 322 into the video data 316.

In step 818, the content source 114 or other appropriate entity compresses the audio data 318 and the video data 316 (including the embedded metadata 322) to create a compressed distribution multiplex. The FIG. 8A process then advances to step 822 of FIG. 8B through connecting letter "A."

In step 822 of FIG. 8B, a reception apparatus 550 receives and demultiplexes the distribution multiplex distributed by the content source 114 to produce compressed audio data and video data. In step 824, a decoder device of the reception apparatus 550 then uncompresses the compressed audio data and video data to produce uncompressed audio data 318 and uncompressed video data 316 (including the embedded metadata 322). In step 826, the reception apparatus 550 formats the audio data 318 and the video data 316 for delivery to the display 138 of the television 122. The FIG. 8B process then advances to step 828 of FIG. 8C through connecting letter "B."

In step 828 of FIG. 8C, the television 122 or other appropriate entity receives or further processes the uncompressed audio data 318 and uncompressed video data 316 (including the embedded metadata 322). In step 830, the detection module 620 of the television 122 scans the video data 316 to detect the embedded metadata 322 by utilizing any effective techniques (e.g., by detecting the presence of the run-in pattern).

In step 832, the extraction module 622 of the television 122 extracts the located metadata 322 from the video data 316. In one embodiment, the television 122 determines symbol values of the watermark representing the embedded metadata based on the luminance values in pixels of a first portion (e.g., first line) of a video frame of the content. For example, when eight pixels make up a symbol, the television 122 averages the luminance values in the eight pixels making up the symbol and determines whether the symbol is a "1" or "0" based on luminance threshold decoding values. For example, for 1-bit per a symbol coding, the television 122 determines that the symbol is "0" when the detected average luminance is less than or equal to a predetermined percentage (e.g., 50%) of an encoding range, and the symbol is "1" when the detected average luminance is greater than the predetermined percentage of the encoding range.

Finally, in step 834, the metadata module 624 processes the extracted metadata 322 to successfully support appropriate advanced features, such as displaying one or more synchronized DOs 144 on the display 138 of the television 122. The FIG. 8C process may then terminate.

With respect to the advanced features. In one embodiment, the television 122 could recognize a channel change (or change of content) either by detecting that the content is no longer Marked (e.g., watermark no longer detected), or by detecting a frame of Marked Content (e.g., a watermark) in which the EIDR value changed. In one embodiment, the content ID is directly identified by the EIDR value in the Content ID Message. In another embodiment, a URL of a remote server or any other information about the content is provided as metadata embedded as the watermark. In another embodiment, two data elements are included in the embedded metadata to identify the media time, the media time in whole seconds is specified in the content ID message while the media time in frames is specified in the frame count message such that timing accuracy is frame-level. Further, the embedded metadata may be used to provide event triggers, that are time-sensitive, in real time.

In certain alternate embodiments, the metadata 322 may similarly be created and inserted into the video data 316 by any other appropriate entity at any point along the distribution path. In certain of these alternate embodiments, the metadata 322 may be inserted without completely decompressing the video data 316. For example, individual macro-blocks of compressed video data 316 (without any metadata 322) could be replaced by corresponding compressed macro-blocks that contain the metadata 322 already embedded. For all of the foregoing reasons, the present disclosure thus provides an improved system and method for distributing metadata embedded in video data.

Figure 9:
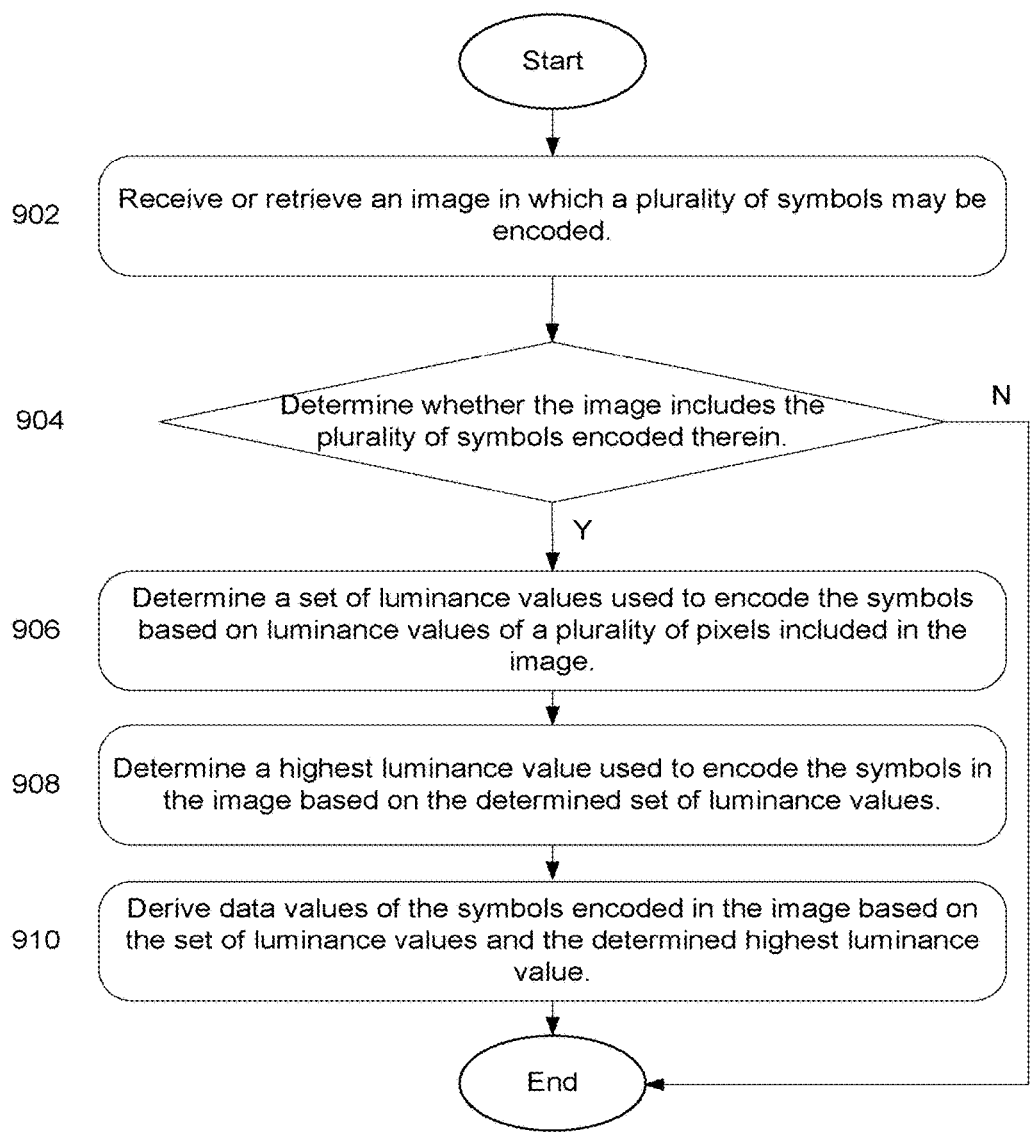
FIG. 9 is a flowchart of method steps for processing an image in which a plurality of symbols is encoded, in accordance with one embodiment of the present disclosure.
Figure 10:
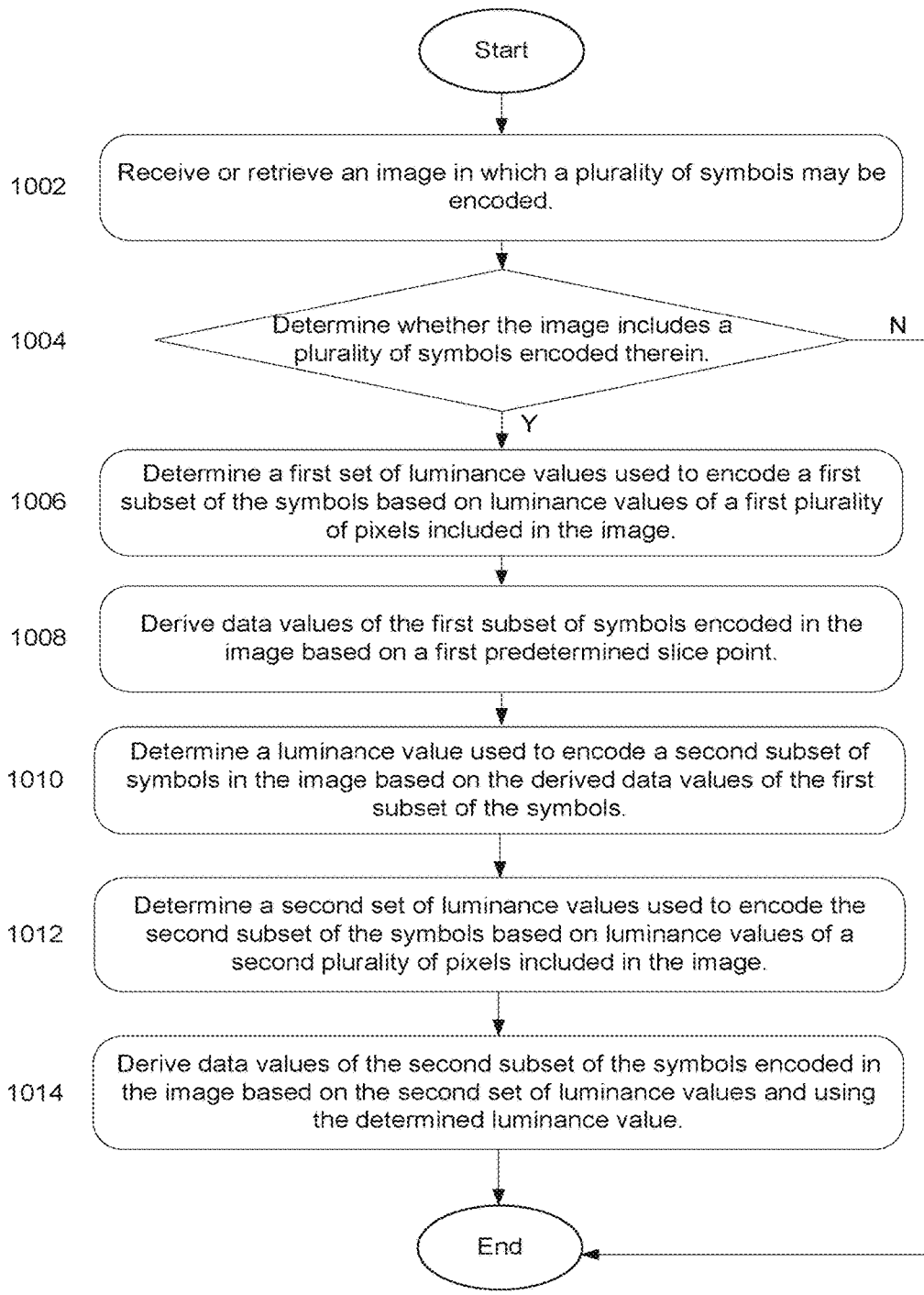
FIG. 10 is a flowchart of method steps for processing an image in which a plurality of symbols is encoded, in accordance with one embodiment of the present disclosure.

FIGS. 9 and 10 illustrate flowcharts of exemplary method steps for recovering the digital data embedded in the video data 316. FIG. 10 illustrates an embodiment in which a luminance value used to encode a plurality of symbols in an image (e.g., a video frame) is calculated by the reception apparatus 550. FIG. 10 illustrates an embodiment in which the luminance value used to encode the plurality of symbols in the image, or any other parameter(s) (e.g., additional luminance values used for encoding, one or more slice points, etc.), is encoded in the image.

Given that the reception apparatus 550 may not know in advance exactly how to "slice" luminance data to extract the digital data, FIG. 9 illustrates an embodiment in which an algorithm is used to optimally set one or more slice points. The algorithm is analogous to data recovery circuits in general use with analog communication systems. In one embodiment, the optimal slice point for 2-level PAM encoding is determined by looking for the location of a peak in a curve of frequency of occurrence of different luminance values and dividing that number by 2.

Figure 13:
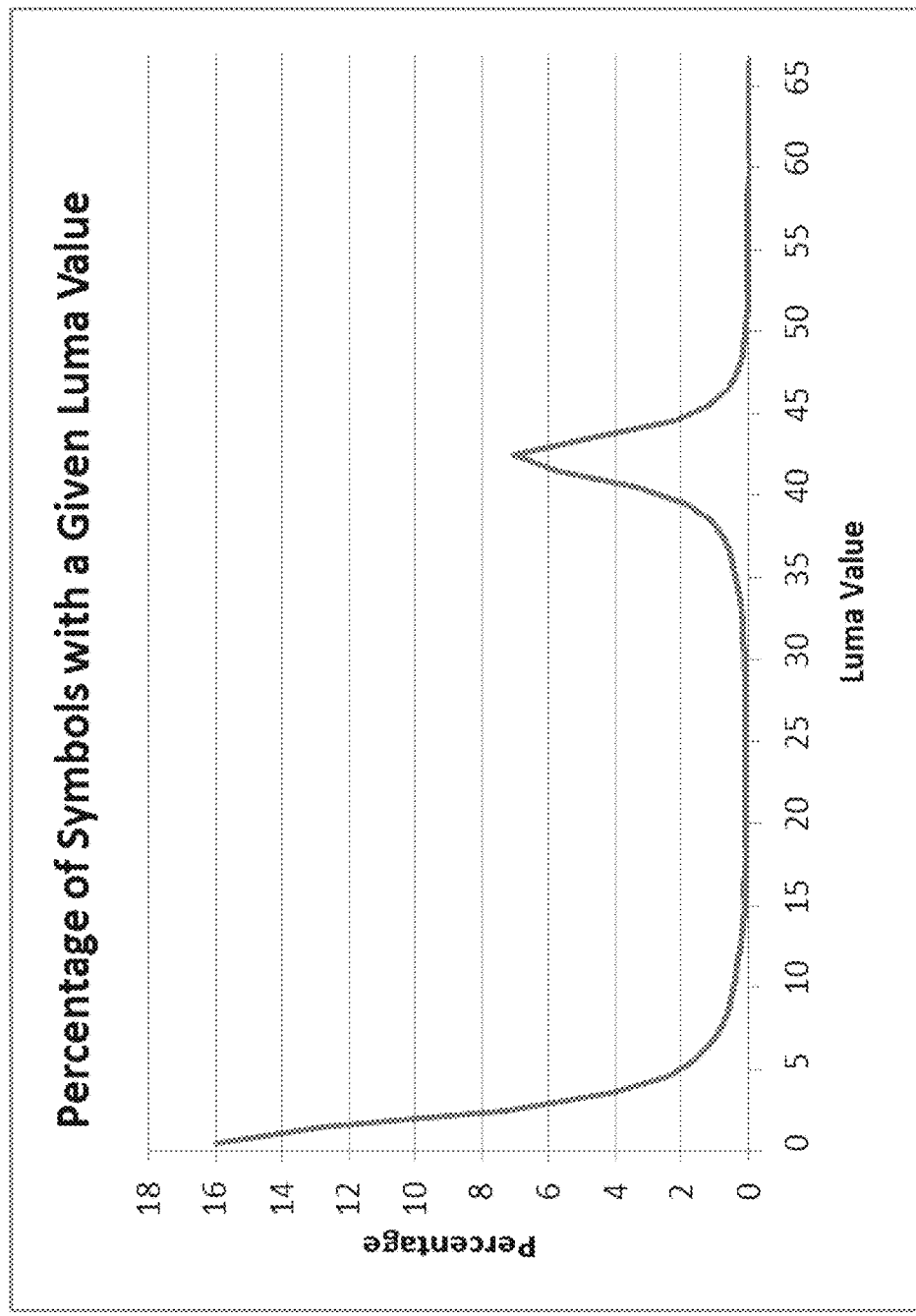
FIG. 13 illustrates an exemplary analysis of watermark symbols, in accordance with one embodiment of the present disclosure.

FIG. 13 illustrates an example analysis of watermark symbols (e.g., a plurality of symbols encoded in an image). The graph was made by analyzing watermarks that were degraded by a process of video encoding/decoding. In all, 36,966 frames of video were analyzed. The two levels of encoding used to encode symbols were luminance values 0 and 42 (in an 8-bit luminance sample. On the Y-axis, the graph shows percentage of symbols that were found to be (on average) a particular value of luminance given in the X-axis. For example, approximately 7% of all symbols had luminance value 42 (the nominal, peak). Nearly zero had value 21 (exactly between the two luminance values originally encoded).

As illustrated in FIG. 9, the reception apparatus 550 receives or retrieves an image in which a plurality of symbols may be encoded in step 902. The image may be a video frame included in a received digital television signal, recorded audio/video content, or any other video or image source.

In step 904, the reception apparatus 550 checks whether the image includes a plurality of symbols encoded therein. If the image is determined not to contain the plurality of symbols, the process ends. The reception apparatus 550 determines whether the image includes a predetermined run-in pattern before proceeding to step 906. The run-in pattern consists of a fixed number of symbols containing pre-determined values. An exemplary process for making this determination is described in further detail below with respect to FIG. 11.

In step 906, the reception apparatus 550 determines a set of luminance values used to encode the symbols based on luminance values of a plurality of pixels included in the image. For example, when a symbol is encoded using a plurality of pixels (e.g., 8), the luminance values of all or a subset of the plurality of pixels used to encode the symbol may be averaged to generate an average luminance value corresponding to that symbol. In this case, the first set of luminance values may include the average luminance values corresponding to the symbols.

In step 908, the reception apparatus 550 determines a highest luminance value used to encode the symbols in the image based on the determined set of luminance values. In one embodiment, the reception apparatus 550 determines the highest luminance value used to encode the symbols based on a number of instances of each luminance value within a predetermined range of luminance values. The highest luminance value is the luminance value within the predetermined range of luminance values having the highest number of instances. For example, with reference to FIG. 13, the reception apparatus 550 identifies a peak within the instances of the different luminance values. Exemplary JavaScript for determining the highest luminance value is illustrated in FIGS. 14A-14C. In one embodiment, when more than one bit is encoded per symbol, the reception apparatus 550 identifies a plurality of different peaks to identify which luminance values are used to encode the different symbol values. In another embodiment, the luminance values used to encode the different symbol values are calculated based on the determined highest luminance value.

In step 910, the reception apparatus 550 derives the data values of the symbols encoded in the image based on the set of luminance values and the determined highest luminance value. The determined highest luminance value is used to determine a slice point. The luminance values in the set of luminance values can be compared with the slice point in order to derive the values of the symbols encoded in the image.

In one embodiment, when 1 bit is encoded per symbol and the lowest luminance value used to encode a symbol is 0, the determined highest luminance value is divided by a predetermined number (e.g., 2) to determine a slice point. However, when the lowest luminance value used to encode a symbol is not 0, the slice point can be calculated using the following formula: lowest luminance value+(highest luminance value−lowest luminance value)/2.

When the determined slice point is not an integer, it is rounded to the closest integer in one embodiment. Subsequently, each of the luminance values in the set of luminance values is compared with the slice point to derive the symbol data values. For example, when one bit is encoded per symbol and the luminance value in the set of luminance values corresponding to a symbol is less than or equal to the splice point, the value for that symbol is determined to be 0. Further, when the luminance value in the first set of luminance values is greater than the splice point, the value for that symbol is determined to be 1.

In another embodiment, when 2 bits are encoded per a symbol, the determined highest luminance value is used to determine three splice points, which are compared with the first set of luminance values to derive the symbol values. For example, when the determined highest luminance value is N and the four luminance values used to encode the symbols are 0, N/3, 2N/3, and N, a first splice point may be determined by N/6, a second splice point may be determined by N/2, and a third splice point may be determined by 5N/6. Any non-integer splice points are rounded to the nearest integer in one embodiment. Subsequently, each of the luminance values in the set of luminance values is compared with at least one of the first, second, or third slice points to derive the symbol data values.

In one embodiment, when the luminance value in the set of luminance values corresponding to a symbol is less than or equal to the first splice point, the value for that symbol is determined to be a first one of 0, 1, 2, or 3 (e.g., 0). When the luminance value in the set of luminance values corresponding to a symbol is greater than the first splice point but less than or equal to the second splice point, the value for that symbol is determined to be a second one of 0, 1, 2, or 3 (e.g., 1). When the luminance value in the set of luminance values corresponding to a symbol is greater than the second splice point but less than or equal to the third splice point, the value for that symbol is determined to be a third one of 0, 1, 2, or 3 (e.g., 2). When the luminance value in the set of luminance values is greater than the third splice point, the value for that symbol is determined to be a fourth one of 0, 1, 2, or 3 (e.g., 3).

FIG. 10 illustrates an embodiment in which a luminance value used to encode symbols in an image, and/or another parameter (e.g., one or more slice points, a plurality of luminance values used to encode symbols, etc.), is encoded in the image. In step 1002, the reception apparatus 550 receives or retrieves an image in which a plurality of symbols may be encoded. The image may be a video frame included in a received digital television signal, recorded audio/video content, or any other video or image source.

In step 1004, the reception apparatus 550 checks whether the image includes a plurality of symbols encoded therein. If the image is determined not to contain the plurality of symbols, the process ends. In one embodiment, the reception apparatus 550 determines whether the image includes a predetermined run-in pattern before proceeding to step 1006. As described above, the run-in pattern consists of a fixed number of symbols containing pre-determined values. An exemplary process for making this determination is described in further detail below with respect to FIG. 11.

In step 1006, the reception apparatus 550 determines a first set of luminance values used to encode a first subset of the symbols based on luminance values of a first plurality of pixels included in the image. The first plurality of pixels is located at a predetermined region of the image. In one embodiment, the first plurality of pixels corresponds to predetermined pixels in lines 1 and/or 2 of a video frame. For example, when the symbols encoded in the image include the predetermined run-in pattern, the predetermined run-in pattern corresponds to an initial plurality of pixels in lines 1 and/or 2, and the first plurality of pixels corresponds to the pixels immediately following the initial plurality of pixels in lines 1 and/or 2.

When a symbol is encoded using a plurality of pixels (e.g., 8), the luminance values of all or a subset of the plurality of pixels used to encode the symbol may be averaged to generate an average luminance value corresponding to that symbol. In this case, the first set of luminance values includes the average luminance values corresponding to the first subset of the symbols.

In step 1008, the reception apparatus 550 derives data values of the first subset of the symbols encoded in the image based on a first predetermined slice point (e.g., luminance value 15). For example, the reception apparatus 550 compares the first set of luminance values to the first predetermined slice point. When a luminance value in the first set of luminance values is less than or equal to the first predetermined slice point, a value of the symbol corresponding to that luminance value is determined to be 0. When the luminance value in the first set of luminance values is greater than the first predetermined slice point, the value of the symbol corresponding to that luminance value is determined to be 1.

In step 1010, the reception apparatus 550 determines a luminance value used to encode a second subset of symbols in the image based on the derived data values of the first subset of the symbols. In other embodiments, the reception apparatus 550 determines one or more slice points, a plurality of luminance values used to encode symbols, again based on the derived values of the first subset of the symbols, etc. For example, the derived data values of the first subset of the symbols define the upper luminance value used when 1-bit is encoded per a symbol, in a case where the lower luminance value is predetermined (e.g., as specified by a standard). In another embodiment, the derived data values of the first subset of the symbols define the one or more splice points, and/or the plurality of luminance values used to encode symbols, to be used to derive values of a second subset of the symbols. For example, the splice point used to determine symbol data values may be identified instead of the upper luminance value. In another embodiment, when 2-bits are encoded per a symbol, three luminance values used to encode symbol data values or corresponding slice points may be identified by the derived data values of the first subset of the symbols.

In step S1012, the reception apparatus 550 determines a second set of luminance values used to encode the second subset of the symbols based on luminance values of a second plurality of pixels included in the image. The second plurality of pixels is located at a predetermined region of the image. In one embodiment, the second plurality of pixels is adjacent to (e.g., immediately follows) the first plurality of pixels. When a symbol is encoded using a plurality of pixels (e.g., 8), the luminance values of all or a subset of the plurality of pixels used to encode the symbol may be averaged to generate an average luminance value corresponding to that symbol. In this case, the second set of luminance values includes the average luminance values corresponding to the symbols.

In step S1014, the reception apparatus 550 derives data values of the second subset of the symbols encoded in the image based on the second set of luminance values and using the highest luminance value determined in step 1010. For example, the values of the second subset of the symbols may be derived in a manner similar to step 1008, as described above. In another embodiment, the data values of the second subset of the symbols are derived by comparing the second set of luminance values with at least one of the one or more splice points defined by the first subset of the symbols. It is noted that the one or more splice points used to derive the data values of the second subset of the symbols may or may not include the first predetermined splice point. Further, it is noted that the number of bits encoded per a symbol may or may not be the same between the first and second subsets of the symbols depending on the embodiment.

Figure 11:
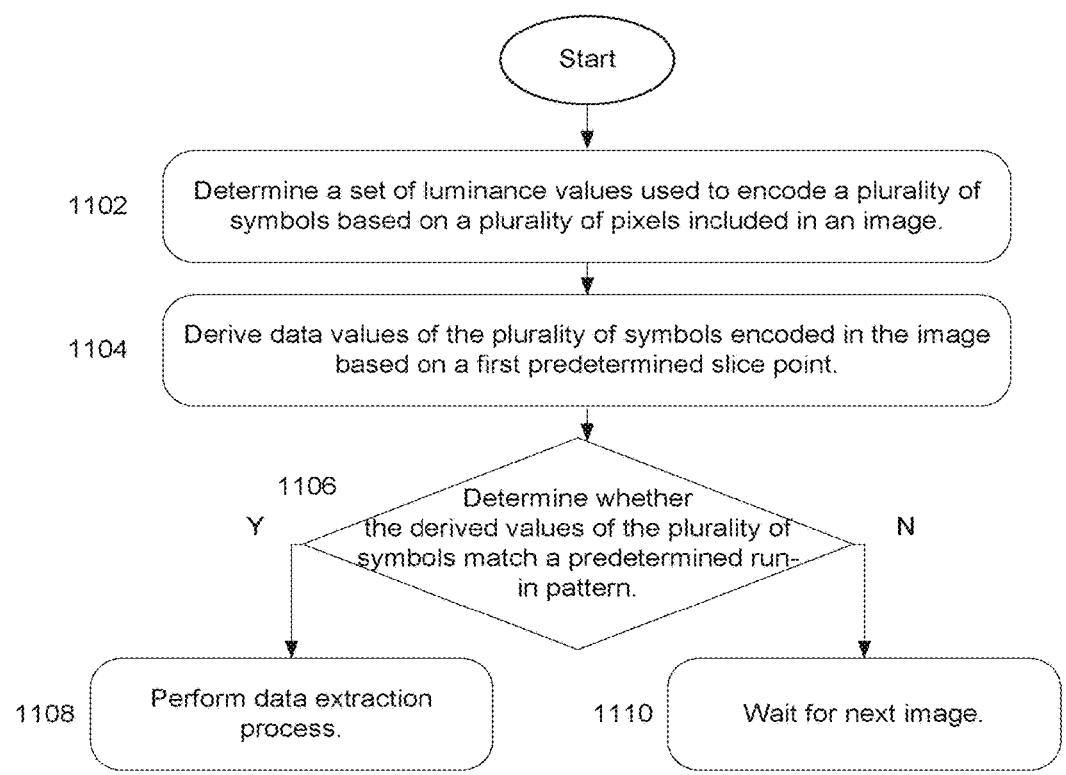
FIG. 11 is a flowchart of method steps for determining whether a plurality of symbols is encoded in an image, in accordance with one embodiment of the present disclosure.

FIG. 11 illustrates a method for determining whether an image, for example, as received or retrieved in step 902 or 1002 includes a plurality of symbols (e.g., digital data) encoded therein. The reception apparatus 550 determines whether a predetermined run-in pattern (e.g., a predetermined fixed pattern of symbol data values) is encoded in the image according to certain embodiments. The presence of the predetermined run-in pattern indicates that the image includes the plurality of symbols encoded therein in certain embodiments.

As illustrated in FIG. 11, in step 1102, the reception apparatus 550 processes the image and determines a set of luminance values that is used to encode a plurality of symbols based on a plurality of pixels included in an image.

In step 1102, the reception apparatus 550 determines a set of luminance values of a predetermined plurality of pixels, included in the image, in which the run-in pattern would typically be encoded. The predetermined plurality of pixels is located at a predetermined region of the image, such as a first predetermined number of pixels in lines 1 and/or 2 of a video frame. When a symbol is encoded using a plurality of pixels (e.g., 8), the luminance values of all or a subset of the plurality of pixels used to encode the symbol may be averaged to generate an average luminance value corresponding to that symbol. In this case, the first set of luminance values includes the average luminance values corresponding to the symbols. Other algorithms may be employed to determine the luminance value of the symbol as it was originally encoded. For example, the highest and lowest luminance values among the plurality of pixels may be discarded before the averaging is done. These methods are designed to account for errors in luminance introduced by the video compression process.

In step 1104, the reception apparatus 550 derives data values of the plurality of symbols encoded in the image based on a predetermined slice point (e.g., luminance value 15). The predetermined slice point may or may not be the same as the first predetermined slice point used in step 1000. For example, for two-level encoding (i.e., 1-bit per a symbol), the reception apparatus 550 compares the set of luminance values to the predetermined slice point. When the luminance value in the set of luminance values is less than or equal to the predetermined slice point, a data value of the symbol corresponding to that luminance value is determined to be 1. When the luminance value in the set of luminance values is greater than the predetermined slice point, the data value of the symbol corresponding to that luminance value is determined to be 1.

In another example, for four-level encoding (i.e., 2-bits per a symbol), the reception apparatus 550 compares the set of luminance values to three different slice points. In one embodiment, when the luminance value in the set of luminance values corresponding to a symbol is less than or equal to the first splice point, the value for that symbol is determined to be a first one of 0, 1, 2, or 3 (e.g., 0). When the luminance value in the set of luminance values corresponding to a symbol is greater than the first splice point but less than or equal to the second splice point, the value for that symbol is determined to be a second one of 0, 1, 2, or 3 (e.g., 1). When the luminance value in the set of luminance values corresponding to a symbol is greater than the second splice point but less than or equal to the third splice point, the value for that symbol is determined to be a third one of 0, 1, 2, or 3 (e.g., 2). When the luminance value in the set of luminance values is greater than the third splice point, the value for that symbol is determined to be a fourth one of 0, 1, 2, or 3 (e.g., 3).

In step 1106, the reception apparatus 550 determines whether the derived data values of the plurality of symbols match the predetermined run-in pattern (e.g., a predetermined fixed pattern of symbol data values). When the reception apparatus 550 determines that the derived values of the plurality of symbols do not match the predetermined run-in pattern, the reception apparatus 550 waits for the next image in step S1110. For example, the process returns to step 902 or 1002.

In another embodiment, the reception apparatus 550 compares the derived values of the plurality of symbols to a plurality of different predetermined run-in patterns in which case the reception apparatus 550 may attempt to perform the method illustrated in FIG. 9 or 10 based on which predetermined run-in pattern is matched. For example, whether or not the modulation level is encoded in the data just following the run-in pattern could be known by which run-in pattern is found.

When the reception apparatus 550 determines that the derived values of the plurality of symbols do match the predetermined run-in pattern, the reception apparatus 550 proceeds to step 1108, at which time the process proceeds to step 906 or 1006. In one embodiment, a determination is made as to whether to proceed to step 906 or 1006 based on which of a plurality of predetermined run-in patterns is matched.

In certain embodiments of the one-bit per symbol system, the luminance values to be used for the "1", value may be restricted to a predetermined set of values, such as multiples of 10 in a range (for example, range 40 to 100, inclusive). Thus, if the luminance value to be used for the "0" value is 0, the reception apparatus 550 would use slice points of either 20, 25, 30, 35, 40, 45, or 50, as appropriate. If a luminance value other than 0 is used for the "0" value, the slice points would be adjusted accordingly. For example, if the predetermined luminance value to be used for the "0" value is 4, the receiver would use slice points of either 22, 27, 32, 37, 42, 47, or 52, as appropriate. The determination in the reception apparatus 550 of which of these six choices is in current use could be determined using the method illustrated in FIG. 9 or 10 in certain embodiments. The luminance values may be restricted to other multiples in other embodiments. The use of predetermined multiples may also facilitate the highest luminance value determination in step 908 in one embodiment. For example, the reception apparatus 550 selects the closest luminance value amongst the possible predetermined numbers.

It is noted that the one or more splice points used to derive the data values of the plurality of symbols in FIG. 11 may or may not include the same splice point as FIG. 9 or 10. Further, it is noted that the number of bits encoded per a symbol may or may not be the same between the symbols in FIG. 11 and FIGS. 9 and 10, depending on the embodiment.

As described above with respect to FIGS. 9 and 10, luminance values of all or a subset of the plurality of pixels used to encode a symbol may be averaged to generate an average luminance value corresponding to that symbol. In one embodiment, instead of averaging all pixels, the first and last pixels are skipped and only the middle pixels (e.g., middle 6) are averaged. In another embodiment, the pixels having the lowest and/or highest values may be discarded before averaging.

Although embodiments of the present disclosure describe that a symbol's data value is set to 0 when a corresponding luminance value is less than or equal to a slice point and set to 1 when the corresponding luminance value is greater than the slice point, it should be noted that the present disclosure is not so limited. In other embodiments, the setting of 0 and 1 may be reversed. Further, the less than or equal to and greater than comparisons with the predetermined slice point may be replaced with a less than and greater than or equal to comparison in other embodiments. Similarly, various other methods for setting a symbol's data value may be utilized when 2 or more bits are encoded per a symbol.

FIGS. 14A-14C illustrate exemplary JavaScript code that implements an algorithm that can be used to process a plurality of symbols encoded in an image according to certain embodiments. The algorithm can be used to compute the peak value (42 in the example illustrated in FIG. 13), which corresponds to the originally encoded luminance value before video compression. The algorithm involves the following steps: over a period or 1 or more frames: (1) for each frame, derive the symbol values by averaging each set of 8 pixels in line 1 and rounding to the nearest integer; (2) count the number of symbol values occurring for each luminance level in the range 20 to 100; and (3) determine the luminance value having the highest number of observed values.

The JavaScript code illustrated in FIGS. 14A-14C utilize the following variables:

rawLuma[ ]—a 1920-element array containing the raw luminance values (8 bit values)

mySymbols[ ]—a 240-element array containing the symbol values bins[ ]—a 256-element array containing the accumulated number of instances where a symbol value matched the index value of the array. For example: bins[30] holds the total number of times a symbol value of 30 was found within the processed number of frames of marked video.

FIG. 14A illustrates exemplary JavaScript code that could be used to derive the symbol values given the raw luminance values. FIGS. 14B and 14C illustrate exemplary JavaScript code that could be used to derive the peak value of symbol luminance over a range in which the upper encoded value may appear. In FIG. 14B, for each frame, after the symbols are collected in mySymbols, the accumulation into bins can be done. In FIG. 14C, after one or more frames have been processed (bin data collected), the peak can be determined. For a two-level encoding, in the case that the luminance value used to encode the "0" value is known to be M, the proper slice point would be M+(peak−M)/2. Testing has shown that even if only one frame is processed this way, a good first approximation is given. Processing several frames can refine the value further.

Figure 15:
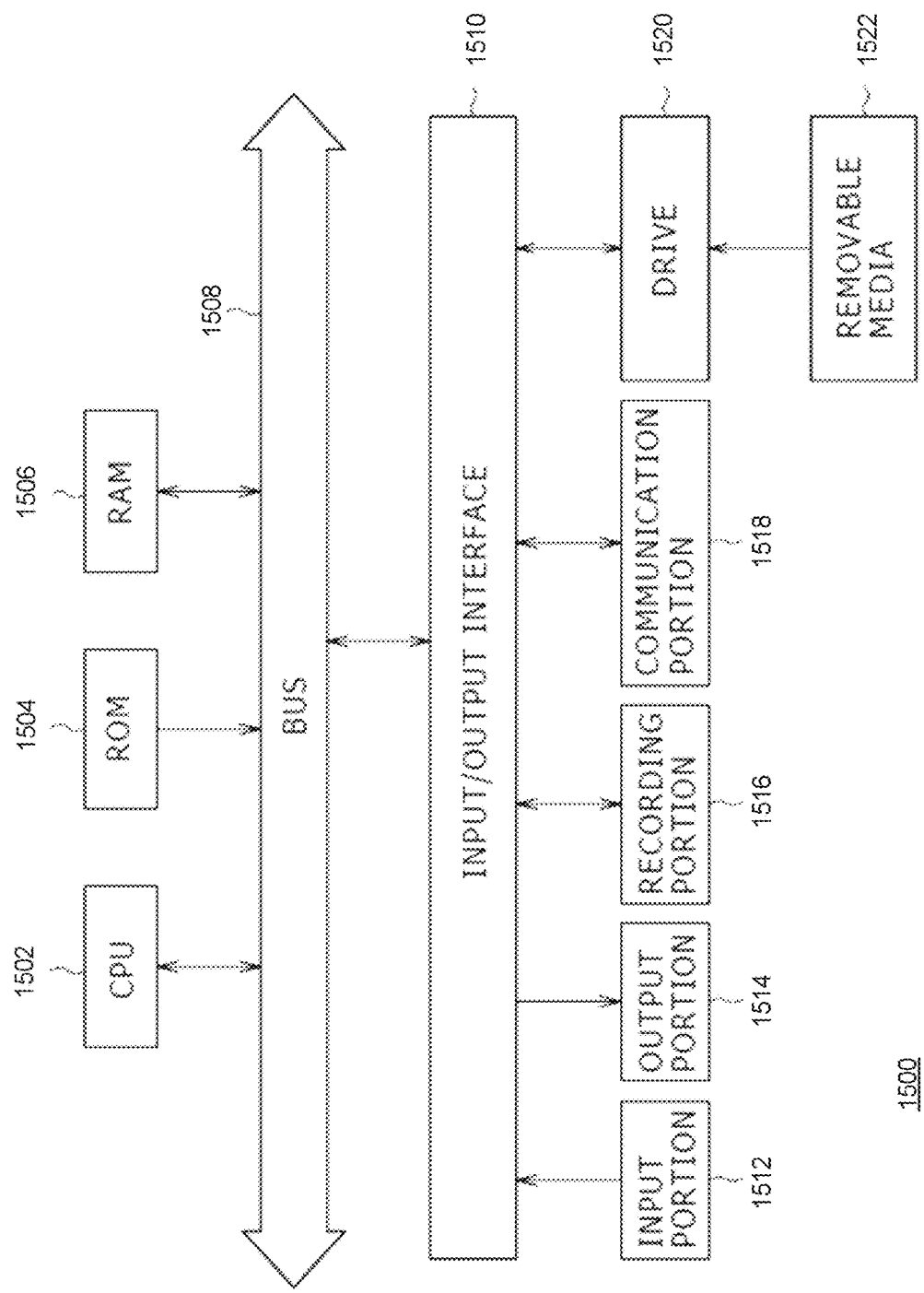
FIG. 15 is an exemplary computer.

FIG. 15 is a block diagram showing an example of a hardware configuration of a computer 1500 configured to perform one or a combination of the functions described above, such as one or more of the functions of the content resource 114, set-top box 118, television 122, server 130, information providing apparatus 250, and/or reception apparatus 550.

As illustrated in FIG. 15, the computer 1500 includes a central processing unit (CPU) 1502, read only memory (ROM) 1504, and a random access memory (RAM) 1506 interconnected to each other via one or more buses 1508. The one or more buses 1508 is further connected with an input-output interface 1510. The input-output interface 1510 is connected with an input portion 1512 formed by a keyboard, a mouse, a microphone, remote controller, etc. The input-output interface 1510 is also connected to a output portion 1514 formed by an audio interface, video interface, display, speaker, etc.; a recording portion 1516 formed by a hard disk, a non-volatile memory, etc.; a communication portion 1518 formed by a network interface, modem, USB interface, FireWire interface, etc.; and a drive 1520 for driving removable media 1522 such as a magnetic disk, an optical disk, a magneto-optical disk, a semiconductor memory, etc.

According to one embodiment, the CPU 1502 loads a program stored in the recording portion 1516 into the RAM 1506 via the input-output interface 1510 and the bus 1508, and then executes a program configured to provide the functionality of the one or combination of the content resource 114, set-top box 118, television 122, server 130, information providing apparatus 250, and/or reception apparatus 550.

As described above, the reception apparatus 550 according to embodiments of the present disclosure can optimally recover embedded digital data, regardless of the amplitude(s) (value(s) of luminance) used in the encoding. Flexibility is offered, and the broadcaster can choose the appropriate tradeoff between visibility and robustness against errors caused by video compression or video transcoding.

The present disclosure has been explained above with reference to certain embodiments. Other embodiments will be apparent to those skilled in the art in light of this disclosure. For example, the present disclosure may readily be implemented using configurations and techniques other than those described in the embodiments above. Additionally, the present disclosure may effectively be used in conjunction with systems other than those described above. Therefore, these and other variations upon the discussed embodiments are intended to be covered by the present disclosure, which is limited only by the appended claims.

The various processes discussed above need not be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the embodiments of the present disclosure are possible in light of the above teachings. It is therefore to be understood that within the scope of the appended claims, the embodiments may be practiced otherwise than as specifically described herein.

The above disclosure also encompasses the embodiments noted below.

(1) A reception apparatus, including circuitry configured to receive or retrieve an image in which a plurality of symbols is encoded, determine a set of luminance values used to encode the symbols based on luminance values of a plurality of pixels included in the image, determine a highest luminance value used to encode the symbols in the image based on the determined set of luminance values, and derive data values of the symbols encoded in the image based on the set of luminance values and using the determined highest luminance value.

(2) The reception apparatus according to feature (1), in which the circuitry is configured to determine the set of luminance values by averaging different subsets of the luminance values of the plurality of pixels included in the image.

(3) The reception apparatus according to feature (1) or (2), in which the circuitry is configured to determine a slice point by using the following equation: slice point=M+(N−M)/2, where M equals a lowest luminance value used to encode the symbols in the image and N equals the determined highest luminance value, and derive the data values of the symbols by comparing the set of luminance values with the slice point.

(4) The reception apparatus according to any one of features (1) to (3), in which the circuitry is configured to determine the highest luminance value used to encode the symbols based on a number of instances of each luminance value within a predetermined range of luminance values, the highest luminance value being the luminance value within the predetermined range of luminance values having the highest number of instances.

(5) The reception apparatus according to any one of features (1) to (4), in which the highest luminance value used to encode the symbols is restricted to a predetermined set of values.

(6) The reception apparatus according to any one of features (1) to (5), in which the image is a video frame, and the symbols are encoded in the first line of the video frame.

(7) The reception apparatus according to any one of features (1) to (6), in which the circuitry is configured to: determine whether a predetermined fixed pattern of symbol data values is encoded in the image, and only when the predetermined fixed pattern of symbol data values is determined to be encoded in the image, determine the set of luminance values, determine the highest luminance value, and derive the data values of the symbols.

(8) A method for processing an image in which a plurality of symbols is encoded, the method including: receiving or retrieving, by circuitry of a reception apparatus, the image in which the plurality of symbols is encoded; determining a set of luminance values used to encode the symbols based on luminance values of a plurality of pixels included in the image; determining, by the circuitry, a highest luminance value used to encode the symbols in the image based on the determined set of luminance values; and deriving, by the circuitry, data values of the symbols encoded in the image based on the set of luminance values and using the determined highest luminance value.

(9) The method according to feature (8), in which the step of determining the set of luminance values comprises: determining the set of luminance values by averaging different subsets of the luminance values of the plurality of pixels included in the image.

(10) The method according to feature (8) or (9), further including: determining a slice point using the following equation: slice point=M+(N−M)/2, where M equals a lowest luminance value used to encode the symbols in the image and N equals the determined highest luminance value, in which the step of deriving the symbols includes deriving the data values of the symbols by comparing the set of luminance values with the slice point.

(11) The method according to any one of features (8) to (10), in which the step of determining the highest luminance value includes determining the highest luminance value used to encode the symbols based on a number of instances of each luminance value within a predetermined range of luminance values, the highest luminance value being the luminance value within the predetermined range of luminance values having the highest number of instances.

(12) The method according to any one of features (8) to (11), in which the highest luminance value used to encode the symbols is restricted to a predetermined set of values.

(13) The method according to any one of features (8) to (12), in which the image is a video frame, and the symbols are encoded in the first line of the video frame.

(14) The method according to any one of features (8) to (13), further including: determining whether a predetermined fixed pattern of symbol data values is encoded in the image, in which the steps of determining the set of luminance values, determining the highest luminance value, and deriving the data values of the symbols are only performed when the predetermined fixed pattern of symbol data values is determined to be encoded in the image.

(15) A non-transitory computer-readable medium storing instructions which, when executed by a computer, causes the computer to perform a method for processing an image in which a plurality of symbols is encoded, the method including: receiving or retrieving the image in which the plurality of symbols is encoded; determining a set of luminance values used to encode the symbols based on luminance values of a plurality of pixels included in the image; determining a highest luminance value used to encode the symbols in the image based on the determined set of luminance values; and deriving data values of the symbols encoded in the image based on the set of luminance values and using the determined highest luminance value.

(16) A reception apparatus, including: circuitry configured to receive or retrieve an image in which a plurality of symbols is encoded, determine a first set of luminance values used to encode a first subset of the symbols based on luminance values of a first plurality of pixels included in the image, derive data values of the first subset of the symbols encoded in the image based on a first predetermined slice point, determine a luminance value used to encode a second subset of the symbols in the image based on the derived data values of the first subset of the symbols, determine a second set of luminance values used to encode the second subset of the symbols based on luminance values of a second plurality of pixels included in the image, and derive data values of the second subset of the symbols encoded in the image based on the second set of luminance values and using the determined luminance value.

(17) The reception apparatus according to feature (16), in which the circuitry is configured to: determine a third set of luminance values used to encode a third plurality of symbols based on luminance values of a third plurality of pixels included in the image, derive data values of the third plurality of symbols encoded in the image based on a second predetermined splice point, determine whether the derived data values of the third plurality of symbols match a predetermined fixed pattern of symbol data values, and only when the derived data values of the third plurality of symbols match the predetermined fixed pattern of symbol data values, determine the first set of luminance values, derive the data values of the first subset of the symbols, determine the luminance value, determine the second set of luminance values, and derive the data values of the second subset of the symbols.

(18) A method for processing an image in which a plurality of symbols is encoded, the method including: receiving or retrieving, by circuitry of a reception apparatus, an image in which a plurality of symbols is encoded; determining a first set of luminance values used to encode a first subset of the symbols based on luminance values of a first plurality of pixels included in the image; deriving data values of the first subset of the symbols encoded in the image based on a first predetermined slice point; determining, by the circuitry, a luminance value used to encode a second subset of the symbols in the image based on the derived data values of the first subset of the symbols; determining a second set of luminance values used to encode the second subset of the symbols based on a second plurality of pixels included in the image; and deriving, by the circuitry, data values of the second subset of the symbols encoded in the image based on the second set of luminance values and using the determined luminance value.

(19) The reception apparatus according to feature (18), further including: determining a third set of luminance values used to encode a third plurality of symbols based on luminance values of a third plurality of pixels included in the image; deriving data values of the third plurality of symbols encoded in the image based on a second predetermined splice point; and determining whether the derived data values of the third plurality of symbols match a predetermined fixed pattern of symbol data values, in which the steps of determining the first set of luminance values, deriving the data values of the first subset of the symbols, determining the luminance value, determining the second set of luminance values, and deriving the data values of the second subset of the symbols are only performed when the derived data values of the third plurality of symbols match the predetermined fixed pattern of symbol data values.

(20) A non-transitory computer-readable medium storing instructions which when executed by a computer causes the computer to perform a method for processing an image in which a plurality of symbols is encoded, the method including: receiving or retrieving an image in which a plurality of symbols is encoded; determining a first set of luminance values used to encode a first subset of the symbols based on luminance values of a first plurality of pixels included in the image; deriving data values of the first subset of the symbols encoded in the image based on a first predetermined slice point; determining a luminance value used to encode a second subset of the symbols in the image based on the derived data values of the first subset of the symbols; determining a second set of luminance values used to encode the second subset of the symbols based on luminance values of a second plurality of pixels included in the image; and deriving data values of the second subset of the symbols encoded in the image based on the second set of luminance values and using the determined luminance value.

(21) An information providing apparatus, including: circuitry configured to receive or retrieve an image in which a plurality of symbols is to be encoded, encode the plurality of symbols in the image, the plurality of symbols being encoded in the image using luminance values of a plurality of pixels included in the image, and provide the image in which the plurality of symbols is encoded to a reception apparatus, in which a luminance value used to encode at least one of the plurality of symbols is set by an operator.

(22) The information providing apparatus according to feature (21), in which data values of a subset of the plurality of symbols identify the luminance value set by the operator.

(23) The information providing apparatus according to feature (21) or (22), in which the operator is of a terrestrial television broadcaster.

(24). A method for providing an image in which a plurality of symbols is encoded, the method including: receiving or retrieving an image in which the plurality of symbols is to be encoded, encoding, by circuitry of an information providing apparatus, the plurality of symbols in the image, the plurality of symbols being encoded in the image using luminance values of a plurality of pixels included in the image, and providing, by the circuitry, the image in which the plurality of symbols is encoded to a reception apparatus, in which a luminance value used to encode at least one of the plurality of symbols is set by an operator.

(25).The method according to feature (24), in which data values of a subset of the plurality of symbols identify the luminance value set by the operator.

(23) The method according to feature (24) or (25), in which the operator is of a terrestrial television broadcaster.

(20) A non-transitory computer-readable medium storing instructions which, when executed by a computer, causes the computer to perform a method for providing an image in which a plurality of symbols is encoded, the method including: receiving or retrieving an image in which the plurality of symbols is to be encoded, encoding the plurality of symbols in the image, the plurality of symbols being encoded in the image using luminance values of a plurality of pixels included in the image, and providing the image in which the plurality of symbols is encoded to a reception apparatus, in which a luminance value used to encode at least one of the plurality of symbols is set by an operator.

The invention claimed is:

1. A reception apparatus, comprising:
circuitry configured to
receive or retrieve an image in which one of a plurality of predetermined run-in patterns and a plurality of symbols is encoded using a set of luminance values,
determine which of the plurality of run-in patterns is encoded in the image,
determine a slice point used to determine data values of the plurality of symbols encoded in the image based on which of the plurality of predetermined run-in patterns is determined to he encoded in the image, and
determine the data values of the plurality of symbols encoded in the image based on the determined slice point.

2. The reception apparatus according to claim 1, wherein the circuitry is configured to
determine the set of luminance values used to encode the plurality of symbols based on luminance values of a plurality of pixels included in the image.

3. The reception apparatus according to claim 2, wherein the circuitry is configured to
determine the set of luminance values by averaging different subsets of the luminance values of the plurality of pixels included in the image.

4. The reception apparatus according to claim 1, wherein the circuitry is configured to, when a first one of the plurality of predetermined run-in patterns is determined to be encoded in the image,
determine a highest luminance value used to encode the plurality of symbols in the image based on the determined set of luminance values, and
determine the slice point based on the determined highest luminance value.

5. The reception apparatus according to claim 4, wherein the circuitry is configured to
determine the highest luminance value used to encode the plurality of symbols based on a number of instances of each luminance value within a predetermined range of luminance values, the highest luminance value being the luminance value within the predetermined range of luminance values having the highest number of instances.

6. The reception apparatus according to claim 1, wherein the image is a video frame, and
the plurality of symbols are encoded in the first line of the video frame.

7. A method for processing an image in which a plurality of symbols is encoded, the method comprising:
receiving or retrieving, by circuitry of a reception apparatus, the image in which one of a plurality of predetermined run-in patterns and the plurality of symbols is encoded using a set of luminance values,
determining, by the circuitry, which of the plurality of run-in patterns is encoded in the image,
determining, by the circuitry, a slice point used to determine data values of the plurality of symbols encoded in the image based on which of the plurality of predetermined run-in patterns is determined to be encoded in the image, and
determining, by the circuitry, the data values of the plurality of symbols encoded in the image based on the determined slice point.

8. The method according to claim 7, further comprising:
determining the set of luminance values used to encode the plurality of symbols based on luminance values of a plurality of pixels included in the image.

9. The method according to claim 8, wherein the determining the set of luminance values comprises:
determining the set of luminance values by averaging different subsets of the luminance values of the plurality of pixels included in the image.

10. The method according to claim 7, further comprising:
when a first one of the plurality of predetermined run-in patterns is determined to be encoded in the image, determining a highest luminance value used to encode the plurality of symbols in the image based on the determined set of luminance values, and determining the slice point based on the determined highest luminance value.

11. The method according to claim 10, wherein the determining the highest luminance value includes determining the highest luminance value used to encode the plurality of symbols based on a number of instances of each luminance value within a predetermined range of luminance values, the highest luminance value being the luminance value within the predetermined range of luminance values having the highest number of instances.

12. The method according to claim 7, wherein the image is a video frame, and the plurality of symbols are encoded in the first line of the video frame.

13. A non-transitory computer-readable medium storing instructions which, when executed by a computer, causes the computer to perform a method for processing an image in which a plurality of symbols is encoded, the method comprising:

receiving or retrieving the image in which one of a plurality of predetermined run-in patterns and the plurality of symbols is encoded using a set of luminance values, determining which of the plurality of run-in patterns is encoded in the image, determining a slice point used to determine data values of the plurality of symbols encoded in the image based on which of the plurality of predetermined run-in patterns is determined to be encoded in the image, and determining the data values of the plurality of symbols encoded in the image based on the determined slice point.

14. The non-transitory computer-readable medium according to claim 7, wherein the method further comprises:

determining the set of luminance values used to encode the plurality of symbols based on luminance values of a plurality of pixels included in the image.

15. The non-transitory computer-readable medium according to claim 14, wherein the determining the set of luminance values comprises:

determining the set of luminance values by averaging different subsets of the luminance values of the plurality of pixels included in the image.

16. The non-transitory computer-readable medium according to claim 7, wherein the method further comprises:

when a first one of the plurality of predetermined run-in patterns is determined to be encoded in the image, determining a highest luminance value used to encode the plurality of symbols in the image based on the determined set of luminance values, and determining the slice point based on the determined highest luminance value.

17. The non-transitory computer-readable medium according to claim 7, wherein the determining the highest luminance value includes determining the highest luminance value used to encode the plurality of symbols based on a number of instances of each luminance value within a predetermined range of luminance values, the highest luminance value being the luminance value within the predetermined range of luminance values having the highest number of instances.

18. The non-transitory, computer-readable medium according to claim 7, wherein the image is a video frame, and the plurality of symbols are encoded in the first line of the video frame.

* * * * *